US 7,440,834 B2

(12) United States Patent
Yamaguchi et al.

(10) Patent No.: US 7,440,834 B2
(45) Date of Patent: Oct. 21, 2008

(54) DRIVE FORCE DISTRIBUTION SYSTEM FOR FOUR WHEEL INDEPENDENT DRIVE VEHICLE

(75) Inventors: Ichiro Yamaguchi, Yokosuka (JP); Yoshitaka Deguchi, Yokohama (JP); Hideaki Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 534 days.

(21) Appl. No.: 11/166,741

(22) Filed: Jun. 27, 2005

(65) Prior Publication Data
US 2006/0015236 A1    Jan. 19, 2006

(30) Foreign Application Priority Data
Jul. 13, 2004  (JP)  ............................. 2004-205689
Sep. 27, 2004  (JP)  ............................. 2004-280139

(51) Int. Cl.
*B60K 17/34*  (2006.01)
*G06F 7/00*   (2006.01)

(52) U.S. Cl. ........................... 701/69; 180/233; 701/89

(58) Field of Classification Search ................. 701/69, 701/81, 89; 180/233–234, 6.2, 242; 303/143
See application file for complete search history.

(56) References Cited

U.S. PATENT DOCUMENTS

| 6,697,728 B2 * | 2/2004 | Kin et al. ................... 701/70 |
| 2005/0096830 A1 * | 5/2005 | Ohta et al. ................. 701/91 |
| 2007/0185638 A1 * | 8/2007 | Odenthal et al. ........... 701/70 |

FOREIGN PATENT DOCUMENTS

JP    10-295004 A    11/1998

* cited by examiner

*Primary Examiner*—Yonel Beaulieu
(74) *Attorney, Agent, or Firm*—Global IP Counselors, LLP

(57) ABSTRACT

A drive force distribution system for a four wheel independent drive vehicle is configured to suppress changes in longitudinal and lateral accelerations and change in yaw moment about the center of gravity of the vehicle that occur when the brake/drive force of one wheel changes or is changed deliberately. The drive force distribution system is configured such that when the brake forces and the drive forces determined by the brake/drive force determining section based on the motion requirements of the vehicle are to be changed, the drive force revising section revises the brake/drive forces of the left front wheel, the right front wheel, the left rear wheel, and the right rear wheel by amounts, respectively, based on the sensitivities of the tire lateral forces of each of the wheels estimated by the tire lateral force sensitivity estimating section so as to satisfy the motion requirements of the vehicle.

18 Claims, 15 Drawing Sheets

DRIVE FORCE DISTRIBUTION SYSTEM FOR FOUR WHEEL INDEPENDENT DRIVE VEHICLE

CROSS-REFERENCE TO RELATED APPLICATIONS

This application claims priority to Japanese Patent Application Nos. 2004-205689 and 2004-280139. The entire disclosures of Japanese Patent Application Nos. 2004-205689 and 2004-280139 are hereby incorporated herein by reference.

BACKGROUND OF THE INVENTION

1. Field of the Invention

The present invention generally relates to a drive force distribution system. More specifically, the present invention relates to a drive force distribution system for a four wheel independent drive vehicle equipped with a separate drive motor for each drive wheel of the four wheel drive vehicle.

2. Background Information

An example of a conventional drive force distribution system is disclosed in Japanese Laid-Open Patent Publication No. 10-295004. The drive force distribution system described in this publication is used for controlling a four wheel independent drive vehicle that is equipped with a separate drive motor for each drive wheel of the four wheel drive vehicle. With the drive force distribution system described in this publication, when only one wheel of four drive wheels is slipping, the output torque that would have been distributed to the slipping wheel, if it were not slipping, is distributed instead to the non-slipping wheel on the same side of the vehicle as the slipping wheel. For example, if the slipping wheel is on the right side of the vehicle, then the output torque from the slipping wheel is distributed to the other wheel on the right side. Similarly, when two wheels located on opposite sides of the vehicle are slipping, the output torque that would have been distributed to each slipping wheel, if it were not slipping, is distributed instead to the non-slipping wheel located on the same side of the vehicle as the slipping wheel. In this way, the change in yaw moment that occurs when the drive force is revised (i.e., the difference between the yaw moment that exists just before the revision and the yaw moment that exists just after the revision) is suppressed. The yaw moment is a moment oriented about the center of gravity of the vehicle that occurs due to the longitudinal acceleration of the vehicle and the drive forces of the wheels.

In view of the above, it will be apparent to those skilled in the art from this disclosure that there exists a need for an improved drive force distribution system. This invention addresses this need in the art as well as other needs, which will become apparent to those skilled in the art from this disclosure.

SUMMARY OF THE INVENTION

It has been discovered that the system described in the aforementioned publication is configured to suppress the change in yaw moment about the center of gravity of the vehicle by redistributing the drive forces of the front and rear wheels on each side (left and right) of the vehicle without changing the total brake/drive force on each side of the vehicle. Thus, the system is not configured to take into consideration changes in the laterally oriented forces that exist between each wheel and the road surface when the brake/drive forces are revised (i.e., the differences between the lateral forces acting just before the revision and the lateral forces acting just after the revision). Consequently, there are situations in which the lateral forces acting on the front wheels and the rear wheels change greatly when the revision is executed and cause the lateral acceleration to change, which causes a change in the yaw moment about the center of gravity of the vehicle. Since these changes are not intended by the driver, they can degrade the driving performance of the vehicle.

The present invention was conceived in view of this problem of unintended changes in yaw moment. One object of the present invention is to provide a drive force distribution system for a four wheel independent drive vehicle that is capable of suppressing the changes in longitudinal and lateral accelerations and the change in yaw moment about the center of gravity of the vehicle that occur when the brake/drive force of one wheel changes or is changed deliberately, when there is a difference between the drive forces of the wheels on the left and right sides of the vehicle and/or the wheels have steering angles.

In order to achieve the above mentioned objects and other objects of the present invention, a drive force distribution system for a four wheel independent drive vehicle is provided that basically comprises a brake/drive force determining section, a tire lateral force sensitivity estimating section, and a drive force revising section. The brake/drive force determining section is configured to determine a brake/drive force to be applied to each of the four wheels based on motion requirements of the vehicle. The tire lateral force sensitivity estimating section is configured to estimate a sensitivity $k1$, $k2$, $k3$, and $k4$ of a tire lateral force with respect to a change in the brake/drive force for each of a left front wheel, a right front wheel, a left rear wheel, and a right rear wheel, respectively. The drive force revising section is configured to revise the drive forces to be applied to the left front wheel, the right front wheel, the left rear wheel, and the right rear wheel based on the sensitivities $k1$, $k2$, $k3$, $k4$ estimated by the tire lateral force sensitivity estimating section. The drive force revising section is further configured to correct the drive forces to be applied to the left front wheel, the right front wheel, the left rear wheel, and the right rear wheel by drive force correction amounts $\Delta Fx1$, $\Delta Fx2$, $\Delta Fx3$, and $\Delta Fx4$, respectively, based on the sensitivities $k1$, $k2$, $k3$, and $k4$ estimated by the tire lateral force sensitivity estimating section so as to satisfy the motion requirements of the vehicle, when the brake/drive forces determined by the brake/drive force determining section are to be changed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
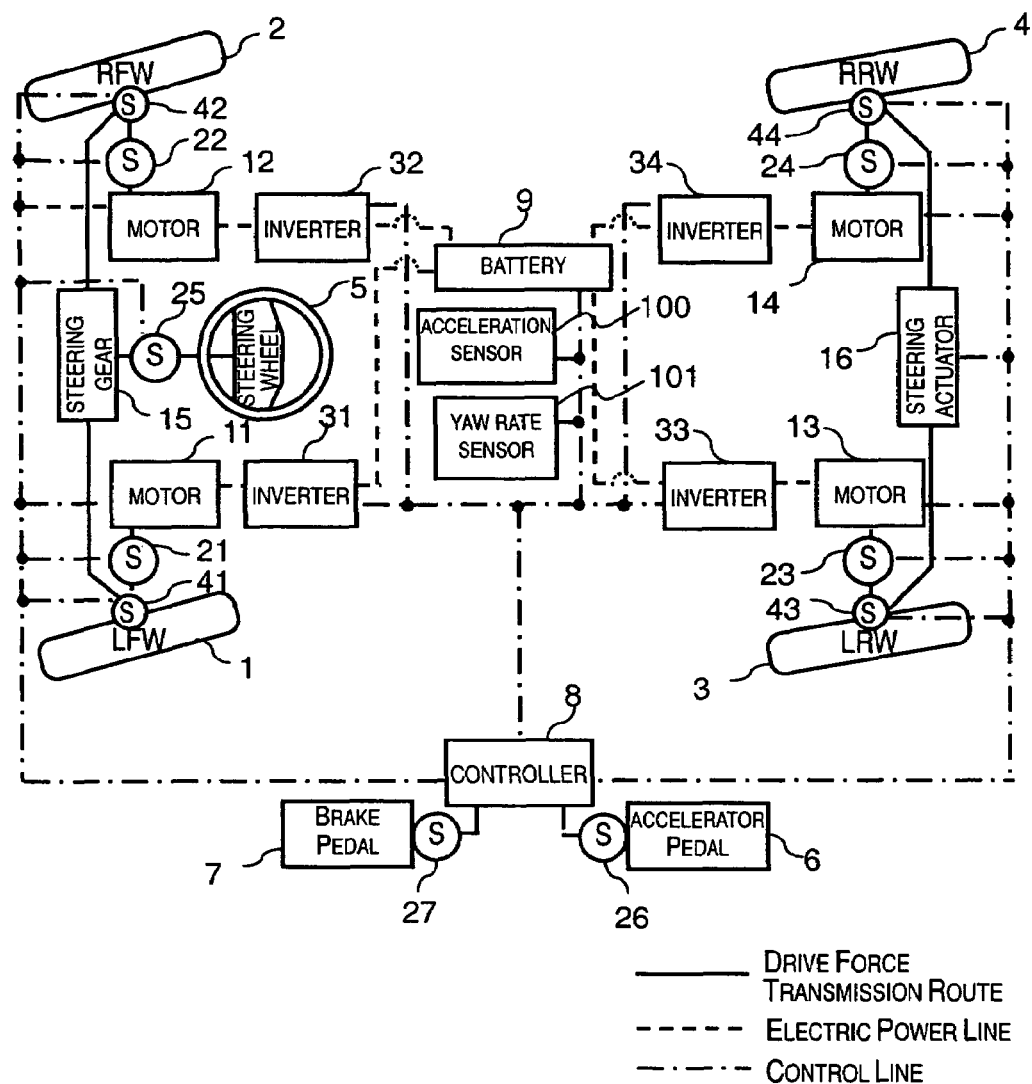
FIG. 1 is a schematic diagram of a four wheel independent drive vehicle equipped with a drive force distribution system in accordance with a first embodiment of the present invention.

Referring initially to FIG. 1, a schematic diagram of a four wheel independent drive vehicle is illustrated that is equipped with a drive force distribution system in accordance with a first embodiment of the present invention. As shown in FIG. 1, the four wheel independent drive vehicle, in which the drive force distribution system is employed, includes a left front wheel 1, a right front wheel 2, a left rear wheel 3, and a right rear wheel 4. With the present invention, as explained below in more detail, when the brake forces and/or the drive forces (hereinafter "brake/drive forces) of the four drive wheels 1 to 4 are to be changed based on the motion requirements of the vehicle, the drive force distribution system revises the brake/drive forces of the four drive wheels 1 to 4 by drive force correction amounts $\Delta Fx1$, $\Delta Fx2$, $\Delta Fx3$, and $\Delta Fx4$, respectively, so as to satisfy the motion requirements of the vehicle. These revisions by the drive force distribution system are based on sensitivities $k1$, $k2$, $k3$, and $k4$ of tire lateral forces of the four drive wheels 1 to 4, respectively, with respect to a change in an estimated brake/drive force as explained below in more detail. Thus, in addition to suppressing changes in the longitudinal acceleration of the vehicle, both changes in lateral acceleration resulting from changes in the lateral forces acting on the tires when the brake/drive forces are revised and changes the yaw moment about the center of gravity off the vehicle can be suppressed. As a result, disturbances of the vehicle behavior not intended by the driver can be prevented and the driving performance of the vehicle can be improved.

The four wheel independent drive vehicle further includes a steering wheel 5, an accelerator pedal 6, a brake pedal 7 and a controller 8. The steering wheel 5 is operatively connected to the left and right front wheels 1 and 2 so that they can be turned (steered) by operating the steering wheel 5. In other words, the driver can adjust the steering angle of the left and right front wheels 1 and 2 by operating the steering wheel 5. The four wheel independent drive vehicle further includes a plurality of motors 11, 12, 13 and 14 with one of the motors 11 to 14 being operatively connected to a corresponding one of the wheels 1 to 4 such that each of the wheels 1 to 4 can be driven independently by its respective one of the motors 11 to 14. The rotational radii (R) of all the wheels 1 to 4 are all the same with the motors 11 to 14 being connected directly to the wheels 1 to 4 with a reduction ratio of 1. Thus, the vehicle is an electric vehicle in the illustrated embodiment.

The four wheel independent drive vehicle further includes a steering gear 15 and a steering actuator 16. The left and right front wheels 1 and 2 are connected to the steering wheel 5 through the steering gear 15 and can be turned (steered) by operating the steering wheel 5, i.e., the driver can adjust the steering angle of the left and right front wheels 1 and 2 mechanically by operating the steering wheel 5. Optionally, the steering actuator 16 is operatively coupled to the left and right rear wheels 3 and 4 to turn (steer) the left and right rear wheels 3 and 4 in response to operation of the steering wheel 5 during certain predetermined driving conditions.

The steering angles of the left and right rear wheels 3 and 4 are adjusted by a steering actuator 16 in accordance with command values issued from the controller 8. Preferably, the gear ratio of the steering gear 15 is set such that the amount of change in the steering angle of the left and right front wheels 1 and 2 that results when the steering wheel 5 is turned is $\frac{1}{16}$ the amount of change in the steering wheel angle. The steering angles of the left and right rear wheels 3 and 4 are adjusted by a steering actuator 16 in accordance with command values issued from the controller 8. The steering angles of the wheels 1 to 4 are detected by steering angle sensors 41 to 44, respectively, and the detected steering angle of each wheel is fed to the controller 8.

The present invention can be applied to vehicles in which the left and right rear wheels 3 and 4 cannot be turned (e.g., non-steerable rear wheels). In this first embodiment, the drive force distribution system for the four wheel independent drive vehicle (which is a vehicle configured such that each of four wheels is driven independently) is configured such that if the brake/drive force of one of the wheels 1 to 4 changes or is changed deliberately, the drive force correction amounts for the remaining three wheels can be found without causing changes in the longitudinal and lateral accelerations of the vehicle or the yaw moment about the center of gravity of the vehicle. The system is based on the assumption that the steering angles $\delta i$ (i=1 to 4) of the wheels are small enough to be ignored.

The four wheel independent drive vehicle further includes a plurality of wheel speed sensors 21 to 24. One of the wheel speed sensors 21 to 24 is provided on each drive shaft of the wheels 1 to 4 with each of the wheel speed sensors 21 to 24 being configured and arranged to send a rotational speed detection signal to the controller 8 that is indicative of the rotational speed of the wheel. The four wheel independent drive vehicle further includes a steering wheel angle sensor 25 operatively arranged to detect the amount by which the steering wheel 5 has been turned. The steering wheel angle sensor 25 sends a steering wheel angle signal to the controller 8 is indicative of the amount by which the steering wheel 5 has been turned.

Preferably, each of the motors 11 to 14 is an alternating current electric motor that is capable of both a power output operation and a regenerative operation, such as a three-phase synchronous motor or a three-phase induction motor. Each of the motors 11 to 14 is operatively connected to one of a plurality of inverters 31, 32, 33 and 34. The inverters 31 to 34 are operatively connected between each of the wheels 1 to 4 and a battery 9 so that direct current power from the battery 9 can be converted into alternating current and used to drive each of the motors 11 to 14 independently in the power output mode and regenerative alternating current power generated by the motors 11 to 14 can be converted into direct current and used to recharge the battery 9 in the regenerative mode. More specifically, based on commands issued from the controller 8, each of the motors 11 to 14 can operate independently in power output mode using alternating current delivered from the respective inverter 31 to 34. Similarly, based on commands issued from the controller 8, each of the motors 11 to 14 can operate in regenerative mode by being driven by the respective wheels 1 to 4 and deliver alternating current to the respective inverter 31 to 34, which converts the alternating current into direct current used to recharge the battery 9. It is preferable for the battery 9 to be a nickel hydrogen battery or a lithium ion battery.

The controller 8 receives at least the following input signals: a steering wheel angle signal issued from the steering wheel angle sensor 25, which is configured to detect the angular amount by which the steering wheel 5 has been turned by the driver; a detection signal issued from an accelerator stroke sensor 26 that is configured to detect the amount by which the driver is depressing the accelerator pedal 6; a detection signal issued from a brake stroke sensor 27 that is configured to detect the amount by which the driver is depressing the brake pedal 7; the steering angle signals issued from the steering angle sensors 41 to 44, which are configured to detect the steering angles of the wheels 1 to 4; an acceleration signal issued from an acceleration sensor 100 arranged at the center of gravity of the vehicle and configured to detect the longitudinal acceleration and lateral acceleration of the vehicle; a yaw rate signal issued from a yaw rate sensor 101 arranged at the center of gravity of the vehicle and configured to detect the yaw motion of the vehicle; the aforementioned wheel speed signals; and the aforementioned steering wheel angle signal.

The controller 8 preferably includes a microcomputer with a brake/drive distribution control program that controls the brake/drive force distribution among the wheels 1 to 4 based on the input signals mentioned above. Thus, the controller 8 is operatively coupled to the various sensors in a conventional manner to receive input signals and then compute the torque distribution of the motors 11 to 14 based on the input signals and control the command values issued to the inverters 31 to 34. The controller 8 also includes other conventional components such as an input interface circuit, an output interface circuit, and storage devices such as a ROM (Read Only Memory) device and a RAM (Random Access Memory) device. The controller 8 is capable of selectively controlling any of the components of the controller 8 in accordance with the control program. It will be apparent to those skilled in the art from this disclosure that the precise structure and algorithms for the controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
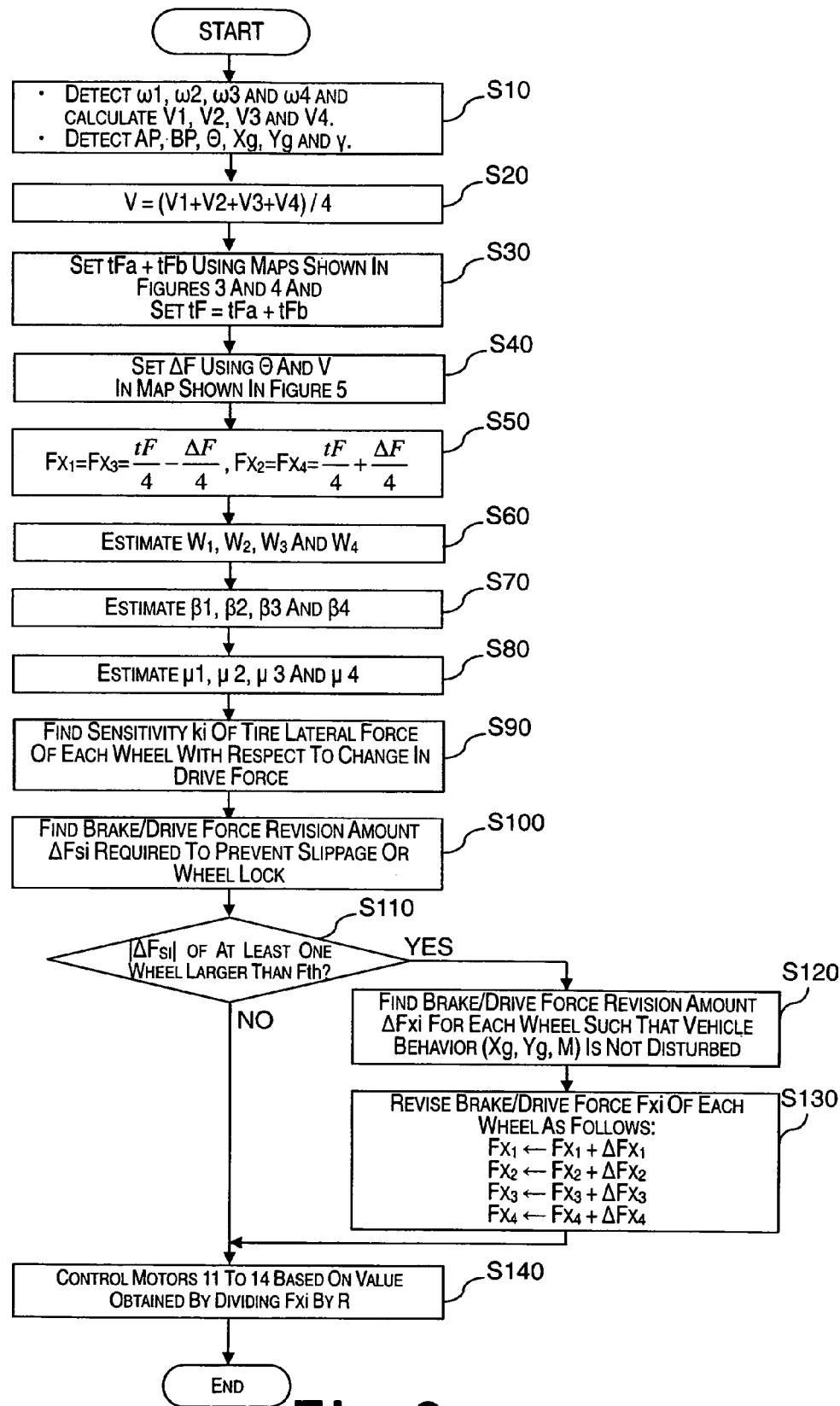
FIG. 2 is a flowchart for the drive force distribution control executed by the controller in the first embodiment.

FIG. 2 is a flowchart showing a routine for computing the torque distribution of the motors 11 to 14 and control the command values issued to the inverters 31 to 34. The routine is executed by the controller 8 once each time a prescribed cycle time elapses. Steps S20 to S50 constitute a brake/drive force determining section that determines the brake/drive force of each wheel based on the motion requirements of the vehicle. Steps S60 to S90 constitute a tire lateral force sensitivity estimating section that estimates the sensitivity k1, k2, k3, and k4 of the tire lateral force for each of the wheels 1 to 4 with respect to a change in drive force. Step S100 constitutes a brake/drive force correction amount determining section for determining the drive force correction amount by which the brake force and/or drive force for each wheel needs to be revised based on factors working to change the brake/drive force determined by the brake/drive force determining section. Steps S120 and S130 constitute a drive force revising section that revises the brake/drive force of each of the wheels 1 to 4 by the amounts $\Delta Fx1$, $\Delta Fx2$, $\Delta Fx3$, and $\Delta Fx4$, respectively, based on the sensitivities k1, k2, k3, and k4 estimated by the tire lateral force sensitivity estimating section so as to satisfy the motion requirements of the vehicle. The steps of the flowchart will now be described in more detail.

In step S10, the controller 8 is configured to multiply the rotational speed $\omega1$, $\omega2$, $\omega3$, and $\omega4$ (unit: rad/s) for each of the wheels 1 to 4 detected by the wheel speed sensors 21 to 24, respectively, by the radius R of the wheels 1 to 4 to compute velocities V1, V2, V3, and V4 (unit: m/s). The controller 8 also reads in the following values: the depression amounts AP (unit: %) of the accelerator pedal 6 and BP (unit: %) of the brake pedal 7 as detected by the accelerator stroke sensor 26 and the brake stroke sensor 27, respectively; the rotation angle $\theta$ (unit: rad) of the steering wheel 5 detected by the steering wheel angle sensor 25; the longitudinal acceleration Xg (unit: m/s$^2$) and lateral acceleration Yg (unit: m/s$^2$) of the vehicle detected by the acceleration sensor 100; and the yaw rate $\gamma$ (unit: rad/s) detected by the yaw rate sensor 101. The speeds V1, V2, V3, and V4 of the wheels 1 to 4 are defined such that a positive value indicates motion in the forward direction of the vehicle. The rotation angle $\theta$ of the steering wheel 5 is defined such that a positive valve indicates counterclockwise rotation. The longitudinal acceleration Xg is defined such that a positive value indicates acceleration in the forward direction of the vehicle. The lateral acceleration Yg is defined such that a positive value indicates acceleration from the center of gravity of the vehicle toward the turning center that exists when the vehicle turns left. The yaw rate $\gamma$ is defined such that a positive value indicates counterclockwise rotation in a top plan view of the vehicle.

In step S20 the controller 8 finds the vehicle speed V (unit: m/s) using the equation (1) below. The vehicle speed V, too, is defined such its value is positive when the vehicle is moving forward.

$$V=(V1+V2+V3+V4)/4 \qquad (1)$$

Figure 3:
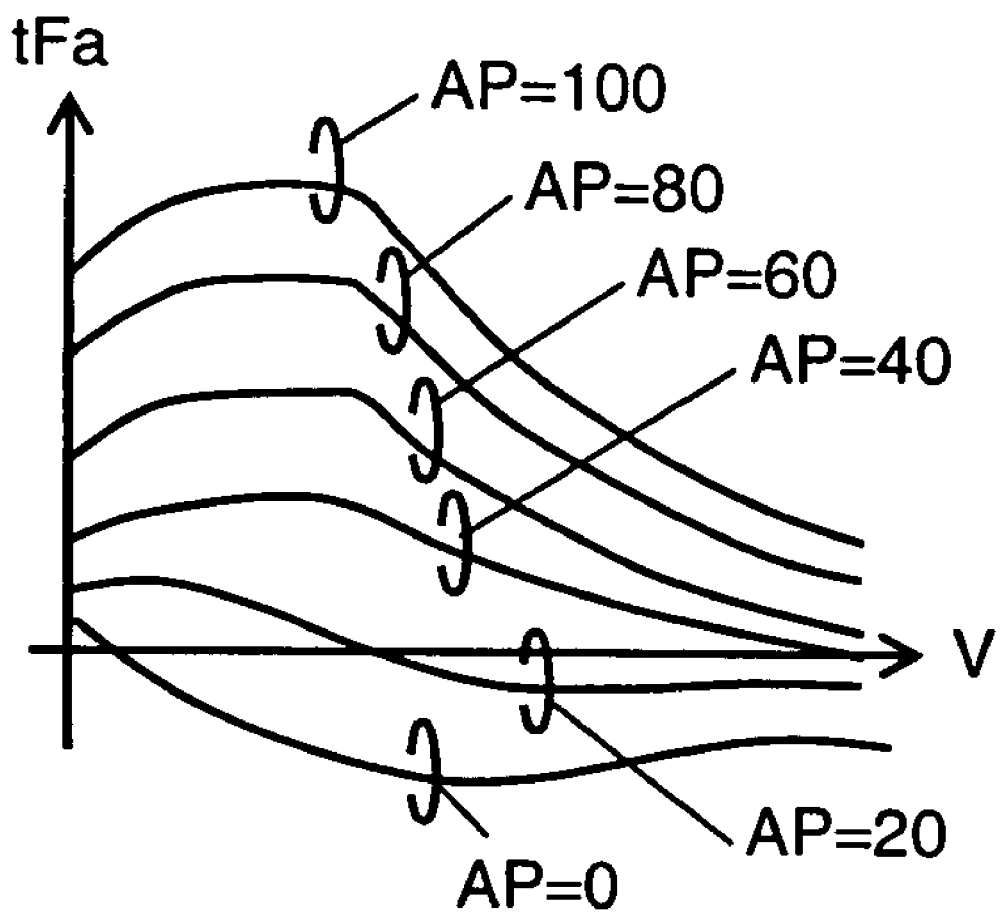
FIG. 3 is a map plotting the drive force requested by the driver versus the accelerator pedal depression amount and the vehicle speed.
Figure 4:
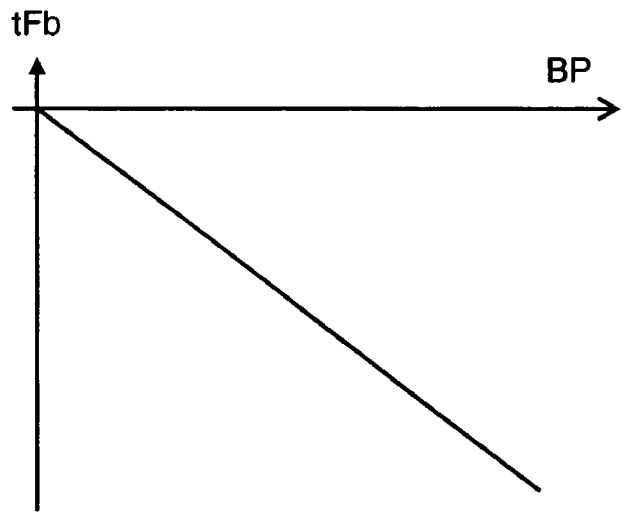
FIG. 4 is a map plotting a target drive force requested by the driver versus the brake pedal depression amount.

In step S30, the drive force tF requested of the electric vehicle by the driver is calculated using the equation (2) below. In the equation, the requested drive force tFa is set by reading the requested drive force corresponding to the depression amount AP of the accelerator pedal 6 and the vehicle speed V from a requested drive torque map such as the one shown in FIG. 3. The requested drive torque map shown in FIG. 3 is recorded in the ROM of the controller 8 in advance. Meanwhile, the requested brake force tFb is set by reading the requested brake force corresponding to the depression amount BP of the brake pedal 7 from a requested brake force map such as the one shown in FIG. 4. The requested brake force map shown in FIG. 4 recorded in the ROM of the controller 8 in advance. Both requested drive forces tF and tFa and the requested brake force tFb are defined to be positive when they are oriented so as to cause the vehicle to accelerate in the forward direction.

$$tF=tFa+tFb \qquad (2)$$

Figure 5:
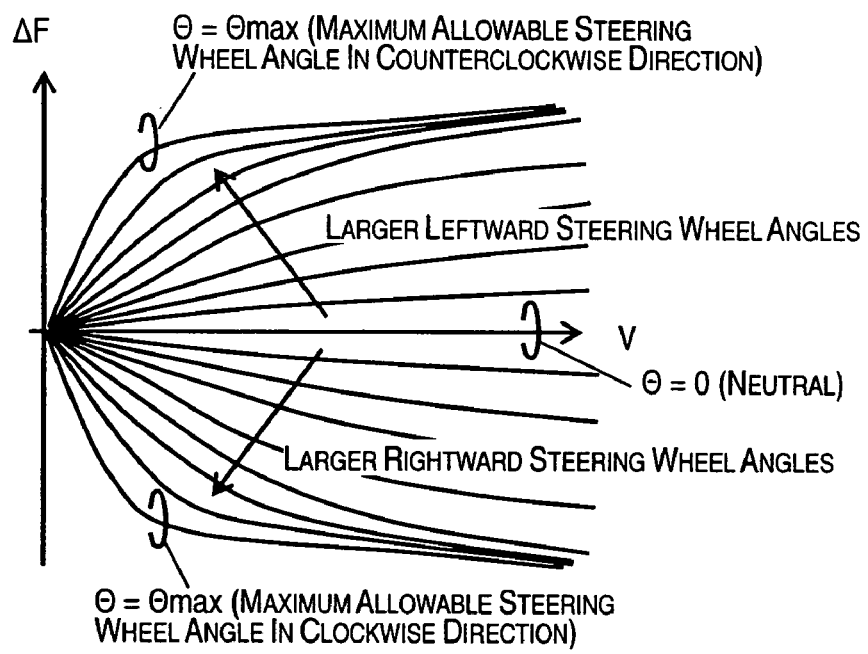
FIG. 5 is a map plotting the target value of the difference between the drive forces for the left and right sides of the vehicle versus the steering wheel rotation angle and the vehicle speed.

In step S40, the controller 8 sets the difference $\Delta F$ (unit: N) between the wheel drive forces on the left and right side of the vehicle based on the rotation angle $\theta$ of the steering wheel 5 and the vehicle speed V using a target left-right wheel drive force difference map that is stored in the ROM of the controller 8 in advance. An example of a target left-right wheel drive force difference map plotting the left-right wheel drive force difference $\Delta F$ versus the steering wheel angle $\theta$ and the vehicle speed V is shown in FIG. 5.

Although in this embodiment the requested drive force set in step S30 and the left-right wheel drive force difference set in step S40 are determined based on a longitudinal motion requirement (acceleration or deceleration), given by the sum of the requested drive force corresponding to the vehicle speed V and the depression amount AP of the accelerator pedal 6 and the requested brake force corresponding to the depression amount BP of the brake pedal 7, and a turning motion requirement (turning direction of vehicle) given by the operation of the steering wheel 5, the invention is not limited defining the motion requirement of the vehicle based on the operations of the pedals 6 and 7 and the steering wheel 5 by the driver. For example, it is also acceptable to set the requested drive force and the left-right wheel drive force difference based on vehicle motion requirements that take into account a longitudinal acceleration, a lateral acceleration, and a yaw rate given by signals from an automatic driving (self-driving) system, such as an accident avoidance system or an automatic tracking system configured to maintain a fixed following distance with respect to preceding vehicles.

In step S50, the brake/drive forces Fx1, Fx2, Fx3, and Fx4 for the wheels 1 to 4 are calculated using the equations (3) and (4) below. The brake/drive forces Fx1, Fx2, Fx3, and Fx4 are defined such that forces acting in the forward direction of the vehicle are positive.

$$Fx1=Fx3=(tF/4)-(\Delta F/4) \qquad (3)$$

$$Fx2=Fx4=(tF/4)+(\Delta F/4) \qquad (4)$$

In step S60, the controller 8 estimates the ground contact or wheel loads W1, W2, W3, and W4 (unit: N) for the wheels 1 to 4. One example of the estimation method is to calculate the wheel loads W1, W2, W3, and W4 of the wheels 1 to 4, respectively, using the equations (5) to (8) below based on the longitudinal acceleration Xg and the lateral acceleration Yg.

$$W1 = \left(\frac{Lr - h \times Xg}{2L} - \frac{\eta f \times h \times Yg}{Lt}\right) W \div g \qquad (5)$$

$$W2 = \left(\frac{Lr - h \times Xg}{2L} + \frac{\eta f \times h \times Yg}{Lt}\right) W \div g \qquad (6)$$

$$W3 = \left(\frac{Lf + h \times Xg}{2L} - \frac{\eta r \times h \times Yg}{Lt}\right) W \div g \qquad (7)$$

$$W4 = \left(\frac{Lf + h \times Xg}{2L} + \frac{\eta r \times h \times Yg}{Lt}\right) W \div g \qquad (8)$$

Figure 7:
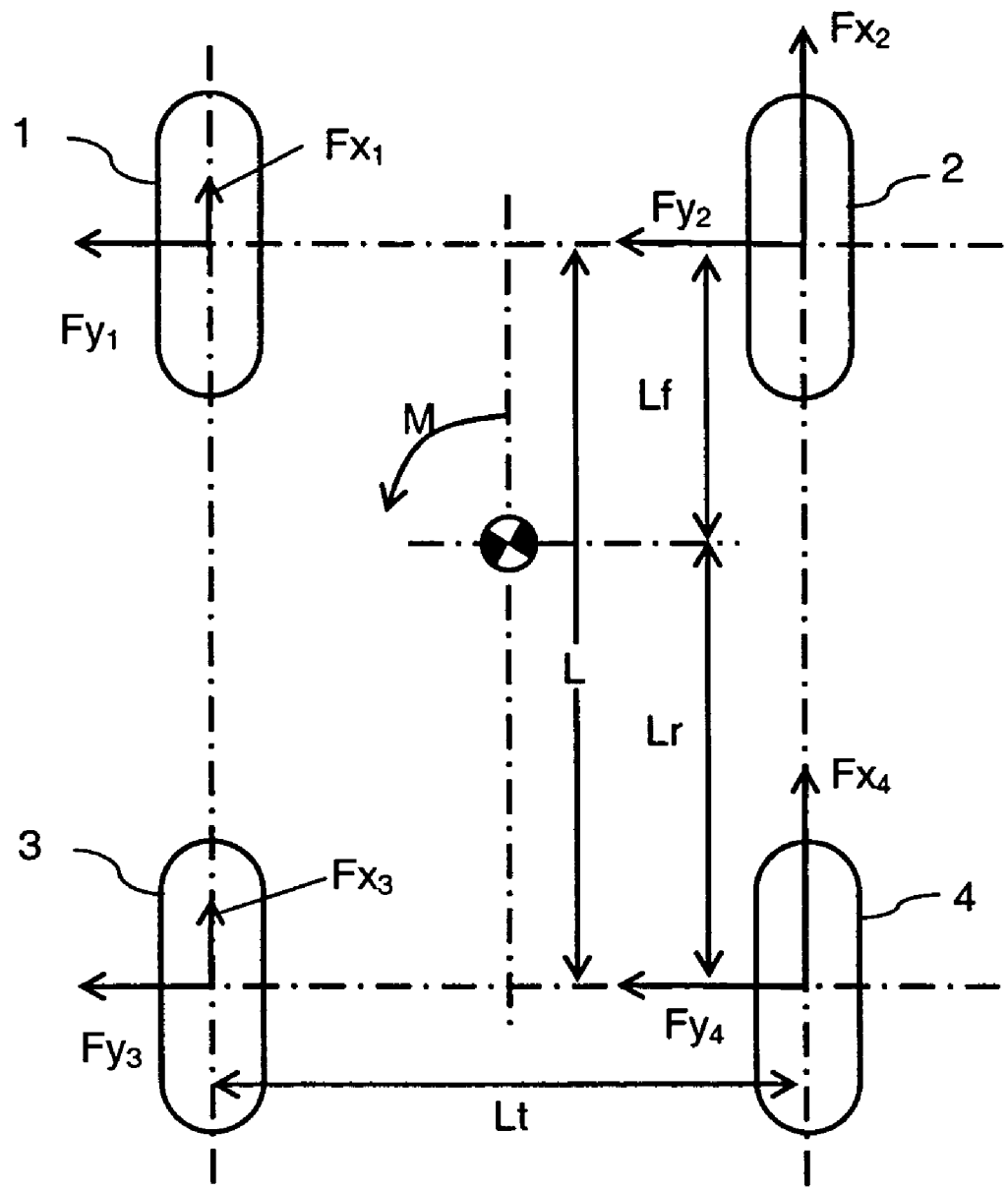
FIG. 7 illustrates the drive force and tire lateral force acting on each wheel during a particular brake/drive force distribution the four wheel independent drive vehicle with the yaw moment acting about the center of gravity of the vehicle in a case where it is assumed that the steering angles of the wheels are sufficiently small.

As shown in FIG. 7, the term L in the equations is the wheelbase (unit: m) of the vehicle which is equal to the sum of Lf and Lr, where Lf is the distance (unit: m) from the center of gravity position about which the vehicle turns when it undergoes yawing to an axis joining the centers of the front wheels and the term Lr is the distance (unit: m) from the center of gravity position about which the vehicle turns when it undergoes yawing to an axis joining the centers of the rear wheels. Additionally, the term Lt is the tread length (unit: m) of the vehicle, the term h is the height (unit: m) of the center of gravity of the vehicle, the term W is the weight of the vehicle, g is the acceleration due to gravity, the term $\eta f$ is the rolling stiffness distribution of the front wheels, the term $\eta r$ is the rolling stiffness distribution of the rear wheels, the term Xg is the longitudinal acceleration of the vehicle, and the term Yg is the lateral acceleration of the vehicle.

In step S70, the controller 8 estimates the lateral slip angles $\beta 1$, $\beta 2$, $\beta 3$, $\beta 4$ (unit: rad) for each of the wheels 1 to 4. The lateral slip angle (also called "slip angle") is the angle between the travel direction of the vehicle and the longitudinal direction of the tires at the current point in time. There are various methods of estimating the lateral slip angle and the method used in this embodiment is only one example. In this embodiment, the lateral slip angle $\beta$ of the vehicle body is estimated based on the lateral acceleration Yg, the yaw rate $\gamma$, and the vehicle speed V read in step S10. The lateral slip angles $\beta 1$, $\beta 2$, $\beta 3$, and $\beta 4$ are then estimated based on the lateral slip angle $\beta$, the yaw rate $\gamma$, the vehicle speed V, and the steering wheel angle $\theta$ as indicated below.

First, the lateral slip angle $\beta$ of the vehicle body is estimated using the equation (9) shown below.

$$\beta = \int (Yg/V - \gamma) dt \qquad (9)$$

Then, the lateral slip angles $\beta 1$, $\beta 2$, $\beta 3$, and $\beta 4$ of the wheels 1 to 4 are calculated using the equations (10) and (11) shown below, $$\beta 1 = \beta 2 = \beta + \theta/Gs - \gamma \times Lf/V \qquad (10)$$

$$\beta 3 = \beta 4 = \beta + \gamma \times Lr/V \qquad (11)$$

where $\beta 1$ and $\beta 2$ are front wheel slip angles, $\beta 3$ and $\beta 4$ are rear wheel slip angles, and Gs is the gear ratio of the steering gear 15. Also, the angles $\beta 1$, $\beta 2$, $\beta 3$, and $\beta 4$ are measured from a line indicating the longitudinal (back to front) direction of the wheels to a line indicating the direction of the wheel velocity in a top plan view of the vehicle and are defined to be positive when said measurement direction is counterclockwise.

In step S80, the controller 8 estimates the road surface friction coefficients $\mu 1$, $\mu 2$, $\mu 3$, and $\mu 4$ for the wheels 1 to 4, respectively. There are various methods of estimating the road surface friction coefficients and the method used in this embodiment is only one example. In this embodiment, the controller 8 first estimates the road surface reaction forces F1 to F4 exerted against the wheels 1 to 4 by the road surface and then estimates the road surface friction coefficients $\mu 1, \mu 2, \mu 3$, and $\mu 4$ for the wheels 1 to 4 based on the wheel loads W1 to W4 found in step S60. More specifically regarding the road surface reaction forces, an electromagnetic torque Tm is exerted by each of the motors 11 to 14 and a road surface reaction torque equal to the product of the reaction force F acting on each of the wheels 1 to 4 and the wheel radius R acts in the opposite direction to the torque exerted by the motors 11 to 14.

The motors 11 to 14 are coupled directly to the wheels 1 to 4. If the torsional rigidity κ of the wheel axles is assumed to be large enough to ignore torsional deformation of the wheel axles, then the rotational speed of each of the motors 11 to 14 and the rotational speed of each of the wheels 1 to 4 can be assumed to be the same rotational speed ω and the motion equation for the rotational components of the motor 1 to 4 and the wheels 1 to 4 is as shown in the equation (12) below. In the equation, the terms Jm and Jw are the moments of inertia of the motors 11 to 14 and the wheels 1 to 4, the terms Cm and Cw are the viscous damping constants of the rotational components of the motors 11 to 14 and the wheels 1 to 4, and the terms Rm and Rw are the internal frictional torque losses of the rotational components of the motors 11 to 14 and the wheels 1 to 4.

$$(Jm+Jw)\omega' = Tm - Cmw \times \omega - Rmw - F \times R \quad (12)$$

As a result, the road surface reaction force F can be estimated by rearranging the equation (12) as shown in the equation (13) below. This same equation can be used to estimate the road surface reaction force F1 to F4 for each of the wheels 1 to 4.

$$F = \{Tm - (Jm+Jw)\omega' - Cmw \times \omega - Rmw\}/R \quad (13)$$

The road surface friction coefficients $\mu 1, \mu 2, \mu 3$, and $\mu 4$ can then be estimated based on the estimated road surface reaction forces F1 to F4 and the tire loads W1 to W4 using the equations (14) to (17) shown below.

$$\mu 1 = F1/W1 \quad (14)$$

$$\mu 2 = F2/W2 \quad (15)$$

$$\mu 3 = F3/W3 \quad (16)$$

$$\mu 4 = F4/W4 \quad (17)$$

The estimation computations of the road surface reaction forces and road surface friction coefficients illustrated with the equation (13) and the equations (14) to (17) can be all accomplished using software stored in the controller 8.

In step S90, the controller 8 finds the sensitivity ki (i=1 to 4) of the tire lateral force of each of the wheels 1 to 4 with respect to a change in drive force based on the wheel load Wi, the lateral slip angle βi, and the road surface friction coefficient βi (i=1 to 4) estimated in steps S60 to S80. The method of calculating the sensitivity ki of the tire lateral force will now be explained using the left front wheel 1 as an example.

Figure 6:
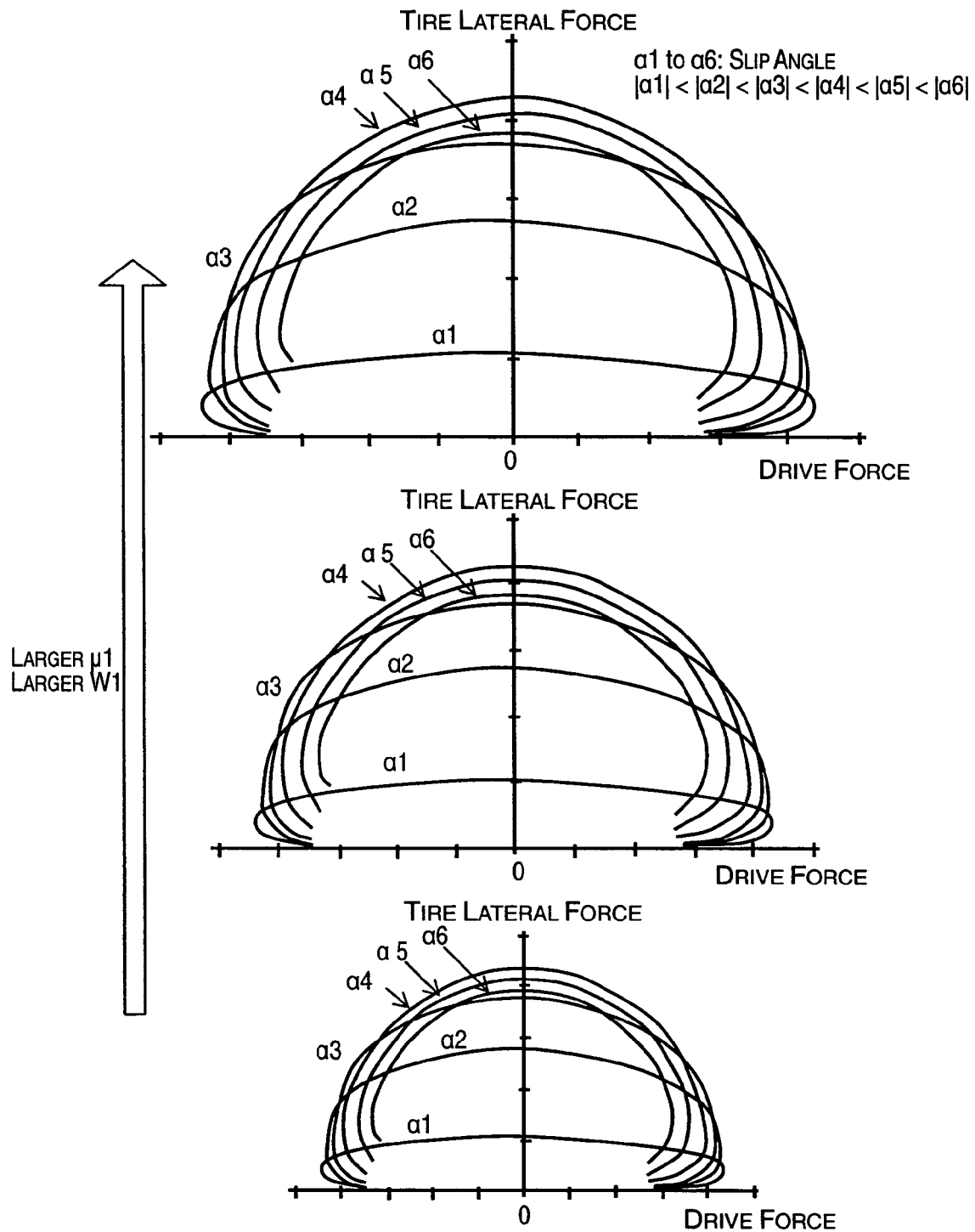
FIG. 6 shows a map stored in the controller that plots relationships between the brake/drive force and the tire lateral force.

An experiment or simulation is conducted to find the relationship between the brake/drive force Fx1 and the tire lateral force Fy1 of the wheel 1 for different values of the wheel load W1, the lateral slip angle β1, and the road surface friction coefficient μ1, and the resulting data is compiled into maps of the tire lateral force versus the brake/drive force like those shown in FIG. 6 and stored in the ROM of the controller 8.

The tire lateral force Fy1 corresponding to the brake/drive force Fx1 at the current point in time and the tire lateral force Fy1+dFy1 corresponding to the brake/drive force Fx1+dFx1 at the next point in time are found using the map and the sensitivity k1 is found using the equation (18) shown below.

$$k1 = dFy1/dFx1 \quad (18)$$

The change in brake/drive force dFx1 (unit: N, dFx1>0) is small enough in comparison with the tire load W1 to be considered infinitesimal. In other words, the sensitivity k1 of the tire lateral force Fy1 with respect to a change in the brake/drive force Fx1 is found as the amount of change dFy1 in the tire lateral force Fy1 that results when the brake/drive force Fx1 changes by an infinitesimal amount dFx1.

Similar maps of the tire lateral force versus the brake/drive force are prepared for the other wheels 2 to 4 and the sensitivities k2 to k4 of the tire lateral forces of the wheels 2 to 4 are found by defining brake/drive force change amounts dFx2, dFx3, and dFx4 that are infinitesimal compared to the wheel loads W2 to W4.

In step S100, the controller 8 determines the brake/drive force correction amount ΔFsi (i=1 to 4) that will be required to prevent the slippage or wheel lock of each of the wheels 1 to 4 if any of the wheels 1 to 4 is undergoing slippage or wheel lock, or exhibiting a tendency toward slippage or wheel lock. These brake/drive force correction amounts ΔFsi (i=1 to 4) are found by calculating the difference between the reaction force Fi (i=1 to 4) exerted on each of the wheels 1 to 4 by the road surface and the brake/drive force Fxi produced by the torque of the motors 11 to 14, i.e., ΔFsi=Fi−Fxi.

Although step S100 in this embodiment is designed to find the brake/drive force correction amounts ΔFsi required to prevent the slippage, wheel lock, or a tendency toward slippage or wheel lock of the wheels 1 to 4, the invention is not limited to finding a correction amount ΔFsi that is related to such factors as slippage and wheel lock. For example, it is also acceptable for step S100 to be contrived to revise the brake/drive forces determined by the brake/drive force determining section, i.e., to set active or passive correction amounts ΔFsi, in response to internal information or such external disturbance factors as a decline in performance caused by a problem in the motors 11 to 14 or motor drive system of a wheels 1 to 4 or a brake/drive force command that exceeds the drive capacity of the motors 11 to 14 of a wheels 1 to 4.

In step S110, the controller 8 determines if the absolute value of the brake/drive force correction amount ΔFsi (|ΔFsi|) is larger than a preset threshold value Fth for one or more of wheels 1 to 4. If so, the controller 8 proceeds to step S120. If not, the controller 8 proceeds to step S140. The threshold value Fth is a value used to determine if the difference between the reaction force Fi exerted by the road surface and the brake/drive force Fxi is large, i.e., if the tendency toward slippage or wheel lock has become large. It is preferable for the threshold value Fth to be set to approximately 1% of the vehicle weight W (unit: N), i.e., 0.01W. The value of the threshold value Fth is set in accordance with the factors on which the change (revision) of the brake/drive forces is based in step S100.

In step S120, a brake/drive force correction amount ΔFxi (i=1 to 4) is calculated for each of the wheels 1 to 4 using the equation (19) shown below. The brake/drive force correction amounts ΔFxi are contrived to remedy the slipping or locked state of the wheels 1 to 4 where the absolute value of the brake/drive force correction amount ΔFsi, i.e., |ΔFsi|, is the largest without disturbing the behavior of the vehicle (i.e., the longitudinal acceleration Xg, the lateral acceleration Yg, and the yaw moment M about the center of gravity of the vehicle).

$$\Delta Fx1 : \Delta Fx2 : \Delta Fx3 : \Delta Fx4 = \quad (19)$$
$$(Lt/L)(k4-k2)+k2(k4-k3): -(Lt/L)(k3-k1)-k1(k4-k3): -$$
$$(Lt/L)(k4-k2)-k4(k2-k1):(Lt/L)(k3-k1)+k3(k2-k1)$$

If the ratios of the brake/drive force correction amounts Fxi of the wheels 1 to 4 are made to satisfy the equation (19), the changes in the longitudinal acceleration Xg, the lateral acceleration Yg, and the yaw moment M about the center of gravity of the vehicle can suppressed (reduced).

Thus, for example, if the absolute value of brake/drive force correction amount $\Delta Fs1$ of the left front wheel 1 is larger than the absolute values of the brake/drive force correction amounts $\Delta Fs2$, $\Delta Fs3$, and $\Delta Fs4$ of the other wheels, then the brake/drive force correction amount of $\Delta Fx1$, $\Delta Fx2$, $\Delta Fx3$, and $\Delta Fx4$ for each of the wheels 1 to 4 is calculated using the equations (20) to (23) below based on the sensitivities k1 to k4 of the tire lateral forces of the wheels 1 to 4 with respect to a change in the brake/drive force.

$$\Delta Fx1 = \Delta Fs \quad (20)$$

$$\Delta Fx2 = \frac{\{-(Lt/L)(k3-k1)+k1(k4-k3)\}}{\{(Lt/L)(k4-k2)+k2(k4-k3)\}} \times \Delta Fs \quad (21)$$

$$\Delta Fx3 = \frac{\{-(Lt/L)(k4-k2)+k4(k2-k1)\}}{\{(Lt/L)(k4-k2)+k2(k4-k3)\}} \times \Delta Fs \quad (22)$$

$$\Delta Fx4 = \frac{\{(Lt/L)(k3-k1)+k3(k2-k1)\}}{(Lt/L)(k4-k2)+k2(k4-k3)\}} \times \Delta Fs \quad (23)$$

The brake/drive force correction amount of $\Delta Fx1$, $\Delta Fx2$, $\Delta Fx3$, and $\Delta Fx4$ for each of the wheels 1 to 4 is found in a similar manner when the absolute value of the brake/drive force correction amount $\Delta Fsi$ of another one of the wheels 1 to 4 is the largest.

In step S130, the brake/drive force Fx1, Fx2, Fx3, and Fx4 of each of the wheels 1 to 4 is revised as indicated in the equations (24) to (27) shown below.

$$Fx1 \leftarrow Fx1 + \Delta Fx1 \quad (24)$$
$$Fx2 \leftarrow Fx2 + \Delta Fx2 \quad (25)$$
$$Fx3 \leftarrow Fx3 + \Delta Fx3 \quad (26)$$
$$Fx4 \leftarrow Fx4 + \Delta Fx4 \quad (27)$$

In step S140, the electric current command values issued to the inverters 31 to 34 are controlled such that the output torque of each of the motors 11 to 14 is adjusted to the value obtained by dividing the new brake/drive force Fxi of each of the wheels 1 to 4 by the tire radius R, i.e., the torque command value for that motor.

The basis for the claim that calculating the brake/drive force correction amount $\Delta Fxi$ (i=1 to 4) for each of the wheels 1 to 4 based on the equation (19) proposed in step S120 does not disturb the behavior of the vehicle (i.e., the longitudinal acceleration Xg, the lateral acceleration Yg, and the yaw moment M about the center of gravity of the vehicle) will now be explained. In short, by calculating the drive force correction amounts for the wheels 1 to 4 as described below, the longitudinal acceleration, the lateral acceleration, and the yaw moment about the center of gravity of the vehicle can be substantially prevented from changing.

FIG. 7 illustrates the drive forces, the lateral forces, and the yaw moment about the center of gravity of the vehicle that act on a four wheel independent drive vehicle under conditions where it can be assumed that the steering angles $\delta i$ (i=1 to 4) of the wheels 1 to 4 are small enough to be ignored. The total drive force Fx of the wheels 1 to 4, the total tire lateral force Fy of the wheels 1 to 4, and the total yaw moment M about the center of gravity of the vehicle generated by the sum total of the drive forces and tire lateral forces acting on the wheels 1 to 4 can be expressed according to the equations (28) to (30) shown below.

$$Fx = Fx1 + Fx2 + Fx3 + Fx4 \quad (28)$$

$$Fy = Fy1 + Fy2 + Fy3 + Fy4 \quad (29)$$

$$M = \{(Fx2+Fx4)-(Fx1+Fx3)\}Lt/2 + \{(Fy1+Fy2) \times Lf - (Fy3+Fy4) \times Lr\} \quad (30)$$

Thus, if the amounts of change in the tire lateral forces that result when the brake/drive forces Fxi (i=1 to 4) change by $\Delta Fx1$, $\Delta Fx2$, $\Delta Fx3$, and $\Delta Fx4$, respectively, are assumed to be $\Delta Fyi$ (i=1 to 4), then the amounts of change $\Delta Fx$, $\Delta Fy$, and $\Delta M$ in the total drive force Fx, total tire lateral force Fy, and total yaw moment M, respectively, can be expressed according to the equations (31) to (33) shown below.

$$\Delta Fx = \Delta Fx1 + \Delta Fx2 + \Delta Fx3 + \Delta Fx4 \quad (31)$$

$$\Delta Fy = \Delta Fy1 + \Delta Fy2 + \Delta Fy3 + \Delta Fy4 \quad (32)$$

$$\Delta M = \{(\Delta Fx2+\Delta Fx4)-(\Delta Fx1+\Delta Fx3)\}Lt/2 + \{(\Delta Fy1+\Delta Fy2) \times Lf - (\Delta Fy3+\Delta Fy4) \times Lr\} \quad (33)$$

Figure 8:
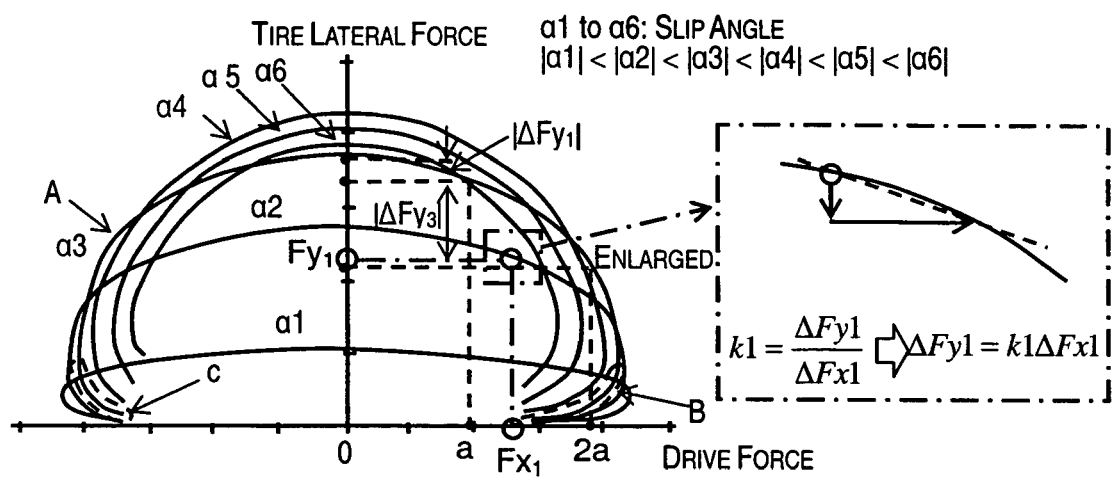
FIG. 8 is a characteristic diagram showing plots of the tire lateral force versus the brake/drive force.

The relationship between a drive force Fxi and the corresponding tire lateral force Fyi (i=1 to 4) is as shown in FIG. 8. FIG. 8 shows the relationship between the drive force and the tire lateral force when the wheel load and road surface friction coefficient are assumed to be constant. The drive force is indicated on the horizontal axis and the tire lateral force is indicated on the vertical axis. As can be seen in FIG. 8, since all of the tire lateral forces Fy1, Fy2, Fy3, and Fy4 are positive when the front wheels 1 and 2 are turned to the left while being driven as shown in FIG. 7, the tire lateral force decreases as the drive force increases. However, at both ends of the curve corresponding to each slip angle in FIG. 8, the relationship between the drive force and the tire lateral force becomes inverted (e.g., see the regions B and C (enclosed in dotted line) of curve A, which corresponds to the slip angle β3). These inverted regions correspond to wheel spinning (region B) when the wheel is being driven and substantial locking of the wheel (region C) when the wheel is being braked. These regions are not normally used and are ignored in this embodiment.

Now, if the drive force correction amount $\Delta Fxi$ and the change in the tire lateral force $\Delta Fyi$ are very small (substantially infinitesimal), the sensitivity ki (i=1 to 4) of the tire lateral force of each of the wheels 1 to 4 with respect to the change in the drive force $\Delta Fxi$ under conditions of the current drive force Fxi and the tire lateral force Fyi can be expressed according to the equation (34) below.

$$ki = \frac{\Delta Fyi}{\Delta Fxi} \quad (34)$$

If the drive force correction amount $\Delta Fxi$ and the amount of change in tire lateral force $\Delta Fyi$ are very small such that the equation (34) is an adequate approximation, then the amount of change in the tire lateral force can be expressed as $\Delta Fyi = ki \times \Delta Fxi$ and the equations (32) and (33) for the change in the total tire lateral force $\Delta Fy$ and the change in the total yaw moment $\Delta M$ and can be rewritten as shown in the equations (35) and (36) below.

$$\Delta Fy = k1\Delta Fx1 + k2\Delta Fx2 + k3\Delta Fx3 + k4\Delta Fx4 \quad (35)$$

$$\begin{aligned}\Delta M &= \{(\Delta Fx2 + \Delta Fx4) - (\Delta Fx1 + \Delta Fx3)\}Lt/2 + \\ & \quad \{(\Delta Fy1 + \Delta Fy2) \times Lf - (\Delta Fy3 + \Delta Fy4) \times Lr\} \\ &= (k1Lf - Lt/2)\Delta Fx1 + (k2Lf + Lt/2)\Delta Fx2 + \\ & \quad (-k3\ Lr - Lt/2)\Delta Fx3 + (-k4Lr + Lt/2)\Delta Fx \end{aligned} \quad (36)$$

Thus, the equations (31), (35), and (36) can be combined (rearranged) into the equation (37) below.

$$\begin{bmatrix} \Delta Fx \\ \Delta Fy \\ \Delta M \end{bmatrix} = \begin{bmatrix} 1 & 1 & 1 & 1 \\ k_1 & k_2 & k_3 & k_4 \\ (k_1Lf - Lt/2) & (k_2Lf + Lt/2) & (-k_3Lr - Lt/2) & (-k_4Lr + Lt/2) \end{bmatrix} \begin{bmatrix} \Delta Fx_1 \\ \Delta Fx_2 \\ \Delta Fx_3 \\ \Delta Fx_4 \end{bmatrix} \quad (37)$$

By setting the left side of the equation (37) to all zeros, i.e., by setting the amounts of change $\Delta Fx$, $\Delta Fy$, and $\Delta M$ in the total brake/drive force, total tire lateral force, and total yaw moment, respectively, to 0 as shown in the equation (38) below, $$\begin{bmatrix} 0 \\ 0 \\ 0 \end{bmatrix} = \begin{bmatrix} 1 & 1 & 1 & 1 \\ k_1 & k_2 & k_3 & k_4 \\ (k_1Lf - Lt/2) & (k_2Lf + Lt/2) & (-k_3Lr - Lt/2) & (-k_4Lr + Lt/2) \end{bmatrix} \begin{bmatrix} \Delta Fx_1 \\ \Delta Fx_2 \\ \Delta Fx_3 \\ \Delta Fx_4 \end{bmatrix} \quad (38)$$

the following equations (39) to (41) for the drive force correction amounts $\Delta Fx2$, $\Delta Fx3$, and $\Delta Fx4$ can be obtained by solving the simultaneous equations expressed by the matrix equation (38) for the drive force correction amounts $\Delta Fx2$, $\Delta Fx3$, and $\Delta Fx4$ using the drive force correction amount $\Delta Fx1$ of the left front wheel.

$$\Delta Fx2 = \frac{\{-(Lt/L)(k3-k1) - k1(k4-k3)\}}{\{(Lt/L)(k4-k2) + k2(k4-k3)\}} \times \Delta Fx1 \quad (39)$$

$$\Delta Fx3 = \frac{\{-(Lt/L)(k4-k2) - k4(k2-k1)\}}{\{(Lt/L)(k4-k2) + k2(k4-k3)\}} \times \Delta Fx1 \quad (40)$$

$$\Delta Fx4 = \frac{\{+(Lt/L)(k3-k1) + k3(k2-k1)\}}{\{(Lt/L)(k4-k2) + k2(k4-k3)\}} \times \Delta Fx1 \quad (41)$$

where L is the wheelbase and $L = Lf + Lr$.

Thus, since the equations (39) to (41) correspond to a case in which the amounts of change $\Delta Fx$, $\Delta Fy$, and $\Delta M$ of the total drive force, the total tire lateral force, and the total yaw moment are each equal to 0, it should be clear that when the ratios of the drive force correction amounts $\Delta Fx1$, $\Delta Fx2$, $\Delta Fx3$, and $\Delta Fx4$ satisfy the aforementioned equation (19) used in step S120, there is zero change in the drive force Fx, the tire lateral force Fy, and the yaw moment M.

$$\begin{aligned}\Delta Fx1 : \Delta Fx2 : \Delta Fx3 : \Delta Fx4 = & \\ (Lt/L)(k4-k2) + k2(k4-k3) : -(Lt/L)(k3-k1) - k1(k4-k3) : - & \\ (Lt/L)(k4-k2) - k4(k2-k1) : (Lt/L)(k3-k1) + k3(k2-k1) & \end{aligned} \quad (19)$$

Thus, once the sensitivity ki of the tire lateral force for each of the wheels 1 to 4 with respect to a change in the brake/drive force of the same wheel has been defined, the brake/drive forces of the wheels 1 to 4 can be revised in such a manner that the total drive force Fx, the total tire lateral force Fy, and the yaw moment M do not change by revising the brake/drive forces in accordance with the ratios established by the equation (19) based on the sensitivities ki. In short, when the brake/drive force of one of the wheels 1 to 4 changes due to wheel slippage or a problem with the vehicle or when the brake/drive force is changed deliberately, changes in the drive force Fx, the tire lateral force Fy, and the yaw moment M that are not intended by the driver can be prevented by changing the brake/drive force of the remaining three wheels 1 to 4 in such a fashion that the ratios thereof with respect to the change in the brake/drive force of the one of the wheels 1 to 4 are in accordance with the equation (19).

In cases where the vehicle is turning, accelerating, or decelerating, cases where a comparatively small brake/drive force being applied to each of the wheels 1 to 4, and cases where the vehicle is operating in a front wheel drive state or rear wheel drive state and the wheel load ratios of the front and rear wheels are substantially equal or the wheel load ratios of the left and right wheels are substantially equal, it is possible for the sensitivities ki of the tire lateral forces of the wheels 1 to 4 with respect to a change in drive force found in step S90 to have such values that the product of the sensitivities k1 and k4 of the left front wheel 1 and the right rear wheel 4 substantially equals the product of the sensitivities k2 and k3 of the right front wheel 2 and the left rear wheel 3. When the product of the sensitivities k1, k4 of the left front wheel 1 and the right rear wheel 4 substantially equals the product of the sensitivities k2 k3 of the right front wheel 2 and the left rear wheel 3, the required brake/drive force correction amounts $\Delta Fsi$ for the wheels 1 to 4 calculated in step S100 can be revised with a high degree of precision in step S120 to brake/drive force correction amounts $\Delta Fxi$ (i=1 to 4) that do not disturb the behavior of the vehicle (i.e., the longitudinal acceleration Xg, the lateral acceleration Yg, and the yaw moment M about the center of gravity of the vehicle) by setting the brake/drive force correction amounts as follows:

$$\Delta Fx1 = -\Delta Fx3 \text{ and } \Delta Fx2 = -\Delta Fx4$$

(i.e., $\Delta Fx1:\Delta Fx2:\Delta Fx3:\Delta Fx4 = k2:-k:-k2:k1$).

This conclusion can be explained by rearranging the relationships of the equation (19) used in step S120 using the condition $k1 \times k4 = k2 \times k3$ as indicated in the equations (42) to (44) below.

$$\Delta Fx1:\Delta Fx3 = (Lt/L)(k4-k2) + k2(k4-k3): \quad (42)$$
$$-(Lt/L)(k4-k2) - k4(k2-k1)$$
$$= (Lt/L)(k4-k2) + k2k4 - k2k3:$$
$$-(Lt/L)(k4-k2) - k2k4 + k1k4$$
$$= 1:-1$$
$$(\because k1 \times k4 = k2 \times k3)$$

$$\Delta Fx2:\Delta Fx4 = (Lt/L)(k3-k1) + k1(k4-k3): \quad (43)$$
$$-(Lt/L)(k3-k1) + k3(k2-k1)$$
$$= (Lt/L)(k3-k1) - k1k4 + k1k3:$$
$$(-(Lt/L)(k3-k1) + k2k3 - k1k3$$
$$= 1:-1$$
$$(\because k1 \times k4 = k2 \times k3)$$

$$\frac{\Delta Fx4}{\Delta Fx1} = \frac{\{(Lt/L)(k3-k1) + k3(k2-k1)\}}{\{(Lt/L)(k4-k2) + k2(k4-k3)\}}$$

If we let $k1 \times k2 = k2 \times k3 = \eta$, then we can substitute $k1 = \eta k2$ and $k3 = \eta k4$ to obtain the following:

$$= \{(Lt/L)(\eta k4 - \eta k2) + \eta k4(k2 - \eta k2)\}/ \quad (44)$$
$$\{(Lt/L)(k4-k2) + k2(k4 - \eta k4)]$$
$$= \eta\{(Lt/L)(k4-k2) + k2k4(1-\eta)\}/\{(Lt/L)(k4-k2) + k2k4(1-\eta)\}$$
$$= \eta$$
$$= k1/k2 = k3/k4$$

When the vehicle is turning and the sensitivities ki of the tire lateral forces of the wheels 1 to 4 with respect to a change in the brake/drive force calculated in step S90 are such that the sensitivities k1 and k2 of the left front wheel 1 and the right front wheel 2 are substantially equal ($k2-k1 \approx 0$) (in which case the sensitivities k3 and k4 of the left rear wheel 3 and the right rear wheel 4 are also substantially equal ($k4-k3 \approx 0$) due to the aforementioned relationship $k1 \times k4 = k2 \times k3$), the required brake/drive force correction amounts $\Delta Fsi$ calculated in step S100 can be revised with a higher degree of precision in step S120 to the brake/drive force correction amounts $\Delta Fx1$, $\Delta Fx2$, $\Delta Fx3$, and $\Delta Fx4$ that result in zero change of the longitudinal acceleration, lateral acceleration, and yaw moment about the center of gravity of the vehicle by setting the brake/drive force correction amounts $\Delta Fx1$, $\Delta Fx2$, $\Delta Fx3$, and $\Delta Fx4$ of the wheels 1 to 4 in such a manner that the ratios thereof are as follows: $\Delta Fx1:\Delta Fx2:\Delta Fx3:\Delta Fx4 = 1:-1:-1:1$.

The reason for this result is that when $k2-k1=0$ (and, similarly, $k4-k3=0$), the equation (44) can be further developed as shown in the equation (45) below.

$$\frac{\Delta Fx4}{\Delta Fx1} = \frac{k1}{k2} = 1 \quad (45)$$

Thus, when the vehicle is turning, the drive force distributions to the left and right front wheels 1 and 2 and the left and right rear wheels 3 and 4 are substantially equal to the wheel load ratios. More specifically, the wheel loads of the wheels on the outside of the turn are larger and the wheel loads of the wheels on the inside of the turn are smaller. With the drive force correction amount ratios described above, the brake/drive forces on the left and right sides are differentiated such that the brake/drive forces of the wheels on the outside of the turn are larger and the brake/drive forces of the wheels on the inside of the turn are smaller.

Figure 9:
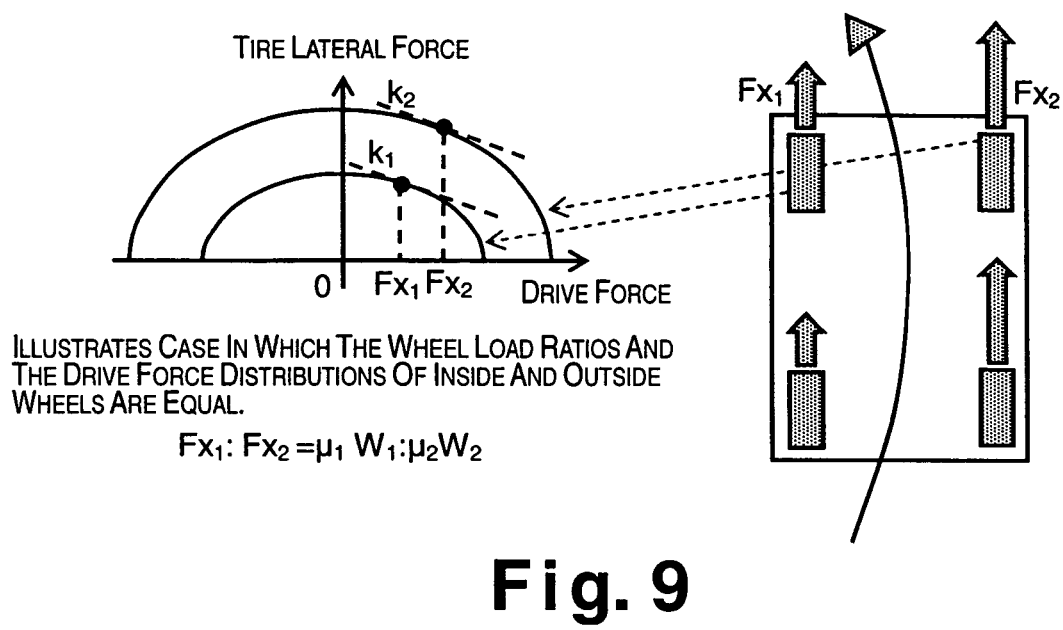
FIG. 9 is a characteristic diagram showing a plot of the tire lateral force versus the brake/drive force during a particular traveling state in which the left and right wheels under conditions where the ellipses (plots) corresponding to the left and right wheels are substantially similar in shape.

The relationship between the brake/drive force and the tire lateral force can be approximated as an ellipse (the long radius being proportional to the wheel load) and when the slip angles of the left and right wheels are the equal, the ellipses corresponding to the left and right wheels are substantially similar in shape, as shown in FIG. 9. In such a case, if the drive force distributions to the left and right wheels are set to be equal to the wheel load ratios, then the sensitivities k of the left and right wheels will also be equal, as indicated in FIG. 9.

The combined force (resultant friction force) resulting from the brake/drive force and the tire lateral force acting on the surface of each tire that contacts the ground generally does not exceed the wheel load of the tire. Setting the drive force distribution of the left and right wheels to be equal to the wheel load ratio serves to balance the load born by the left and right wheels and is an effective drive force distribution method for preventing slippage.

In a case where the vehicle is operating in a front wheel drive state or a rear wheel drive state, it is possible for the sensitivities ki of the tire lateral forces of the wheels 1 to 4 with respect to a change in drive force found in step S90 to have such values that the sensitivities k1 and k2 are both approximately 0 or the sensitivities k3 and k4 are both approximately 0. When the sensitivities k1 and k2 are both approximately 0 or the sensitivities k3 and k4 are both approximately 0, the required brake/drive force correction amounts $\Delta Fsi$ for the wheels 1 to 4 calculated in step S100 are revised in step S120 by setting the brake/drive force correction amounts of the right rear wheel 4 and the left front wheel 1 such that $\Delta Fx4/\Delta Fx1 = k3/k4$ when k1 and k2 are both approximately 0 and such that $\Delta Fx4/\Delta Fx1 = k1/k2$ when k1 and k2 are both approximately 0. A situation in which the sensitivities k1 and k2 are both approximately 0 is a situation in which the brake/drive forces of the left and right front wheels 1 and 2 are both small and the vehicle is operating in a rear wheel drive state, and a situation in which the sensitivities k3 and k4 are both approximately 0 is a situation in which the brake/drive forces of the left and right rear wheels 3 and 4 are both small and the vehicle is operating in a front wheel drive state. In either of these situations, too, brake/drive force correction amounts $\Delta Fx1$, $\Delta Fx2$, $\Delta Fx3$, and $\Delta Fx4$ that result in zero change of the longitudinal acceleration, lateral acceleration, and yaw moment about the center of gravity of the vehicle can be set with higher precision by setting the drive force correction amounts of the left front wheel 1 and the right rear wheel 4 such that $\Delta Fx4/\Delta Fx1 = k3/k4$ or $\Delta Fx4/\Delta Fx1 = k1/k2$.

The reason for this result is that when k1 and k2 are both equal to 0, or k3 and k4 are both equal to 0, the equation (44) can be further developed as shown in the equations (46) and (47) below.

$$\frac{\Delta Fx4}{\Delta Fx1} = \frac{\{(Lt/L)(k3-k1)+k3(k2-k1)\}}{\{(Lt/L)(k4-k2)+k2(k4-k3)\}} \quad (46)$$
$$= k3/k4$$
$$(\because k1=0, k2=0)$$

$$\frac{\Delta Fx4}{\Delta Fx1} = \frac{\{(Lt/L)(k3-k1)+k3(k2-k1)\}}{\{(Lt/L)(k4-k2)+k2(k4-k3)\}} \quad (47)$$
$$= k1/k2$$
$$(\because k3=0, k4=0)$$

When the sensitivities k1 and k2 are both equal to 0, the distribution ratios of the drive force correction amounts ΔFx2 and ΔFx3 for the right front wheel 2 and the left rear wheel 3 can be derived as ΔFx1=−(k4/k3)×ΔFx2=−ΔFx3=(k4/k3)×ΔFx4 due to the facts that ΔFx4/ΔFx1=k3/k4, ΔFx1=−ΔFx3, and ΔFx2=−ΔFx4.

When the sensitivities k3 and k4 are both equal to 0, the distribution ratios of the drive force correction amounts ΔFx2 and ΔFx3 for the right front wheel 2 and the left rear wheel 3 can be derived as ΔFx1=−(k2/k1)×ΔFx2=−ΔFx3=(k2/k1)×ΔFx4 due to the facts that ΔFx4/ΔFx1=k1/k2, ΔFx1=−ΔFx3, and ΔFx2=−ΔFx4.

Second Embodiment

Figure 10:
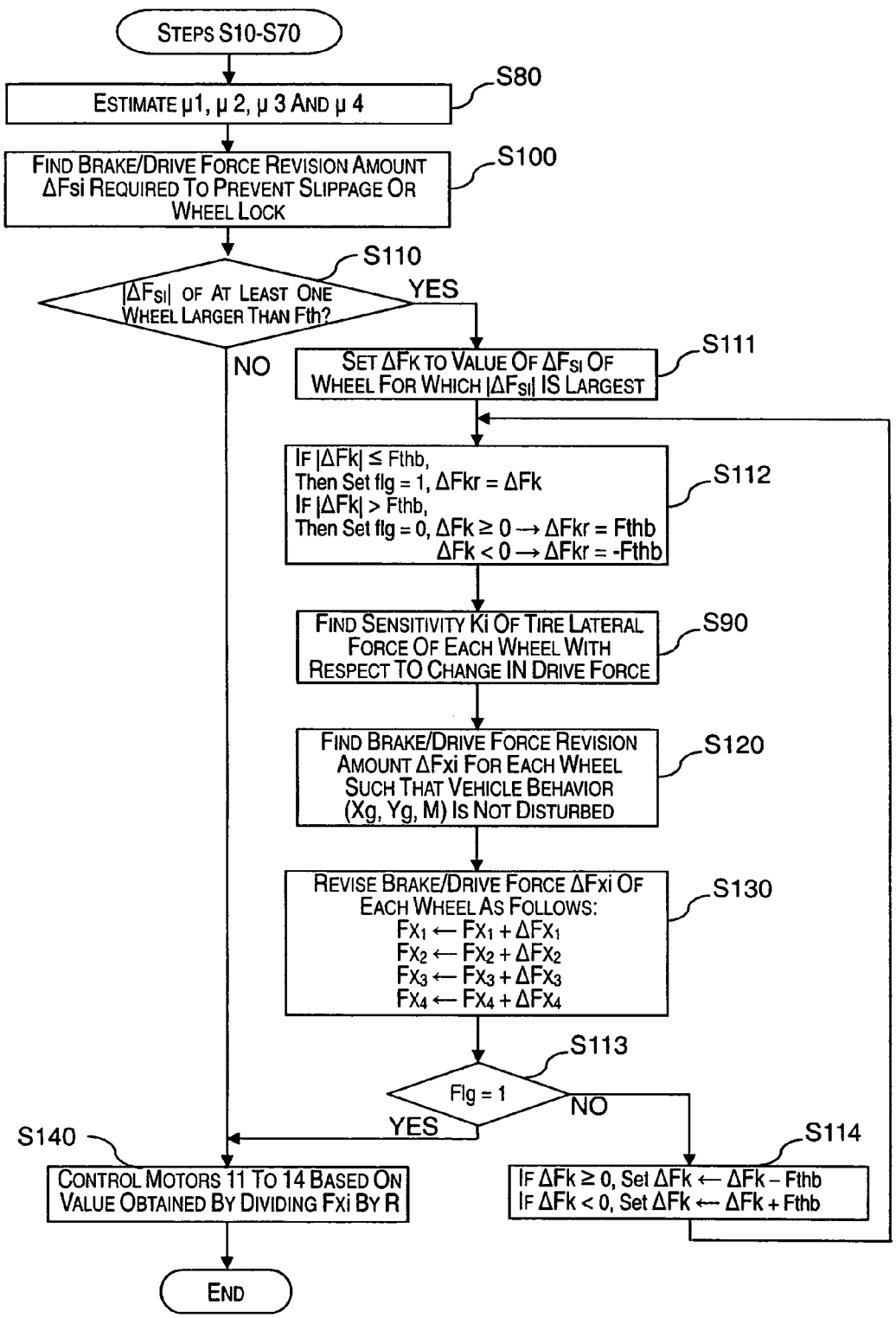
FIG. 10 is a flowchart for the drive force distribution control executed by the controller of a drive force distribution system for a four wheel independent drive vehicle in accordance with a second embodiment of the present invention.

Referring now to FIG. 10, an alternate control program for the controller 8 of the vehicle schematically illustrated in FIG. 1 will now be discussed. Since only the programming is different between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configuration of the vehicle in the second embodiment is the same as the configuration of the first embodiment.

FIG. 10 illustrates a flowchart of the drive force distribution control executed by the controller 8 of the drive force distribution system in accordance with the second embodiment of the present invention. The first embodiment described in FIG. 2 illustrates a case in which the brake/drive forces of the wheels are revised in response to very small amounts of wheel slippage. The control executed by the controller 8 in accordance with FIG. 10 is configured such that larger amounts of slippage, too, can be accommodated by repeating the steps that serve to revise the brake/drive forces to compensate for very small amounts of slippage.

The control steps of the second embodiment will now be described with reference to FIG. 10. Steps S10 to S110 are the same as in FIG. 2 and explanations thereof are omitted here for the sake of brevity. The position of step S90 has been moved to a later position in the control sequence so that the successively changing lateral force sensitivities can be re-detected. FIG. 10 omits steps S10 to S70 and shows only step S80 and subsequent steps.

In step S110, the controller 8 determines if the absolute value of the brake/drive force correction amount ΔFsi (|ΔFsi|) is larger than a preset threshold value Fth for one or more of the wheels 1 to 4. If so, the controller 8 proceeds to step S111. If not, the controller 8 proceeds to step S140. The threshold value Fth is a value used to determine if the difference between the reaction force Fi exerted by the road surface and the brake/drive force Fxi is large, i.e., if the tendency toward slippage or wheel lock has become large. It is preferable for the threshold value Fth to be set to approximately 1% of the vehicle weight W (unit: N), i.e., 0.01 W. The value of the threshold value Fth is set in accordance with the factors on which the change (revision) of the brake/drive forces is based in step S100.

In step S111, the controller 8 assigns the name ΔFk to the brake/drive force correction amount of the wheel having the largest brake/drive force correction amount in anticipation of a situation in which the brake/drive force of more than one wheel requires revising.

In step S112, the controller 8 determines if the absolute value of ΔFk is equal to or less than a threshold value Fthb. If so, the controller 8 sets the value of a flag flg to 1 and sets the value of ΔFkr to the value of ΔFk. If the absolute value of ΔFk is larger than the threshold value Fthb, then the controller 8 sets the flag flg to 0 and sets the value of ΔFkr to Fthb if ΔFk is equal to or larger than 0 and to −Fthb if ΔFk is less than 0.

The flag flg and the threshold value Fthb will now be described. When the brake/drive force of one wheel changes or is changed deliberately, the equation (19) can be used to find brake/drive force correction amounts ΔFxi for each of the remaining three wheels that will not disturb the behavior of the vehicle. However, the equation (19) is based on the assumption that the amount of change in the brake/drive force of each wheel is very small (small enough to be considered infinitesimal). Thus, when ΔFk is too large to be considered infinitesimal, it is difficult to calculate the brake/drive force correction amounts ΔFxi for the remaining three wheels accurately using the equation (19). The flag flg is used to indicate whether the controller has determined that ΔFk is too large or not; the flag flg is set to 0 when ΔFk is too large to be considered infinitesimal and the flag flg is set to 1 when ΔFk is small enough to be considered infinitesimal.

The threshold value Fthb is the absolute value of the maximum amount of change in the brake/drive force that can be assumed to be infinitesimal. When ΔFk is larger than the threshold value Fthb, the brake/drive force of the wheel for which the absolute value of ΔFsi (i.e., |ΔFsi|) is largest is assumed to have changed by an amount equal to Fthb and the brake/drive forces Fxi of the wheels are revised accordingly in steps S120 and S130 (described later). Meanwhile, the value of ΔFk is revised to the value ΔFk−ΔFthb (i.e., if ΔFk is equal to or larger than 0 in step S114).

This processing (step S112 to step S114) is repeated until ΔFk becomes small enough to be considered infinitesimal, i.e., until the condition |ΔFkr|<Fthb is satisfied. In this way, even if ΔFk is too large to be considered infinitesimal, the brake/drive force correction amounts ΔFxi of the remaining three wheels can be obtained. In this embodiment, the threshold value Fthb is set to 4% of the vehicle weight W (unit: N), i.e., 0.04 W.

In step S90, the controller 8 finds the sensitivity ki (i=1 to 4) of the tire lateral force of each of the wheels 1 to 4 with respect to a change in drive force based on the wheel load Wi, the lateral slip angle βi, and the road surface friction coefficient βi (i=1 to 4) estimated in steps S60 to S80. The method of calculating the sensitivity ki of the tire lateral force will now be explained using the left front wheel 1 as an example.

An experiment or simulation is conducted to find the relationship between the brake/drive force Fx1 and the tire lateral force Fy1 of the wheel 1 for different values of the wheel load W1, the lateral slip angle β1, and the road surface friction coefficient μ1, and the resulting data is compiled into maps of the tire lateral force versus the brake/drive force like those shown in FIG. 6 and stored in the ROM of the controller 8.

The tire lateral force Fy1 corresponding to the brake/drive force Fx1 at the current point in time and the tire lateral force Fy1+dFy1 corresponding to the brake/drive force Fx1+dFx1 at the next point in time are found using the map and the sensitivity k1 is found using the equation (18) shown below.

$$k1 = dFy1/dFx1 \quad (18)$$

The change in brake/drive force dFx1 (unit: N, dFx1>0) is small enough in comparison with the tire load W1 to be considered infinitesimal. In other words, the sensitivity k1 of the tire lateral force Fy1 with respect to a change in the brake/drive force Fx1 is found as the amount of change dFy1 in the tire lateral force Fy1 that results when the brake/drive force Fx1 changes by an infinitesimal amount dFx1.

Similar maps of the tire lateral force versus the brake/drive force are prepared for the other wheels 2 to 4 and the sensitivities k2 to k4 of the tire lateral forces of the wheels 2 to 4 are found by defining the brake/drive force change amounts dFx2, dFx3, and dFx4 that are infinitesimal compared to the wheel loads W2 to W4.

In step S140, the electric current command values issued to the inverters 31 to 34 are controlled such that the output torque of each of the motors 11 to 14 is adjusted to the value obtained by dividing the new brake/drive force Fxi of each of the wheels 1 to 4 by the tire radius R, i.e., the torque command value for that motor.

The effects exhibited by the embodiments will now be described.

(A) In each of the above embodiments of the present invention, when the brake/drive forces of the four drive wheels 1 to 4 determined by the brake/drive force determining section (steps S20 to S50) are to be changed based on the motion requirements of the vehicle, the drive force revising section (step S120) revises the brake/drive forces of the left front wheel, the right front wheel, the left rear wheel, and the right rear wheel by the amounts ΔFx1, ΔFx2, ΔFx3, and ΔFx4, respectively, so as to satisfy the motion requirements of the vehicle, the revisions being based on the sensitivities k1, k2, k3, k4 of tire lateral forces of the left front wheel 1, the right front wheel 2, the left rear wheel 3, and the right rear wheel 4, respectively, with respect to a change in drive force estimated by the tire lateral force sensitivity estimating section (steps S60 to S90). Thus, in addition to suppressing changes in the longitudinal acceleration of the vehicle, both changes in lateral acceleration resulting from changes in the lateral forces acting on the tires when the brake/drive forces are revised and changes the yaw moment about the center of gravity off the vehicle can be suppressed. As a result, disturbances of the vehicle behavior not intended by the driver can be prevented and the driving performance of the vehicle can be improved.

(B) The drive force revising section (step S120) is configured such that when the tire lateral force sensitivities estimated by the tire lateral force sensitivity estimating section (steps S60 to S90) are such that the difference between the product of the sensitivities k1 and k4 of the left front wheel 1 and the right rear wheel 4 and the product of the sensitivities k2 and k3 of the right front wheel 2 and the left rear wheel 3 is approximately 0, the drive force revising section sets the drive force correction amounts for the left front wheel 1, the right front wheel 2, the left rear wheel 3, and the right rear wheel 4 in such a manner that the following relationships are satisfied: ΔFx1:ΔFx2:ΔFx3:ΔFx4=k2:−k1:−k2:k1. As a result, when, for example, the wheel load ratio of the front wheels and the wheel load ratio of the rear wheels are the same and the brake/drive forces are revised in order to prevent one of the wheels 1 to 4 from slipping or locking up, correction amounts ΔFx1, ΔFx2, ΔFx3, and ΔFx4 for the brake/drive forces of the wheels 1 to 4 that suppress changes in the longitudinal acceleration, lateral acceleration, and yaw moment about the center of gravity of the vehicle can be calculated with a higher degree of precision.

(C) The drive force revising section (step S120) is configured such that when the tire lateral force sensitivities estimated by the tire lateral force sensitivity estimating section (steps S60 to S90) are such that the difference between the sensitivities k1 and k2 of the left front wheel 1 and the right front wheel 1 is approximately 0 or the difference between sensitivities k3 and k4 of the left rear wheel 3 and the right rear wheel 4 is approximately 0, the drive force revising section sets the drive force correction amounts for the left front wheel 1, the right front wheel 2, the left rear wheel 3, and the right rear wheel 4 in such a manner that the following relationships are satisfied: ΔFx1:ΔFx2:ΔFx3:ΔFx4=1:−1:−1:1. As a result, when, for example, the wheel load ratio of the wheels on the left side of the vehicle and the wheel load ratio of the wheels on the right side of the vehicle are the same and the brake/drive forces are revised in order to prevent one of the wheels 1 to 4 from slipping or locking up, correction amounts ΔFx1, ΔFx2, ΔFx3, and ΔFx4 for the brake/drive forces of the wheels 1 to 4 that suppress changes in the longitudinal acceleration, lateral acceleration, and yaw moment about the center of gravity of the vehicle can be calculated with an even higher degree of precision.

(D) The drive force revising section (step S120) is configured such that when the tire lateral force sensitivities estimated by the tire lateral force sensitivity estimating section (steps S60 to S90) are such that the sensitivities k1 and k2 of the left front wheel 1 and the right front wheel 2 are both approximately 0, the drive force revising section sets the drive force correction amounts ΔFx1, ΔFx2, ΔFx3, and ΔFx4 in such a manner that the ratio between the correction amount ΔFx1 for the left front wheel 1 and the correction amount ΔFx4 for the right rear wheel 4 is given by ΔFx4/ΔFx1=k3/k4. Meanwhile, when the sensitivities k3 and k4 of the left rear wheel 3 and right rear wheel 4 are both approximately 0, the drive force revising section sets the drive force correction amounts ΔFx1, ΔFx2, ΔFx3, and ΔFx4 in such a manner that the ratio between the correction amount ΔFx1 for the left front wheel 1 and the correction amount ΔFx4 for the right rear wheel 4 is given by ΔFx4/ΔFx1=k1/k4. As a result, when, for example, the vehicle is in a rear wheel drive state or a front wheel drive state and the brake/drive forces are revised in order to prevent one of the wheels 1 to 4 from slipping or locking up, correction amounts ΔFx1, ΔFx2, ΔFx3, and ΔFx4 for the brake/drive forces of the wheels 1 to 4 that suppress changes in the longitudinal acceleration, lateral acceleration, and yaw moment about the center of gravity of the vehicle can be calculated with an even higher degree of precision.

(E) The drive force revising section (steps S120) is configured to determine the drive force correction amounts ΔFx1, ΔFx2, ΔFx3, and ΔFx4 for the left front wheel 1, the right front wheel 2, the left rear wheel 3, and the right rear wheel 4 based on the sensitivities k1, k2, k3, and k4 (corresponding respectively to the wheels 1 and 2, 3, 4) estimated by the tire lateral force sensitivity estimating section (steps S60 to S90) in such a manner that the ratios of the drive force correction amounts ΔFx1, ΔFx2, ΔFx3, and ΔFx4 satisfy the following equation, where Lt is the tread length and L is the wheelbase of the four wheel independent drive vehicle: ΔFx1:ΔFx2:ΔFx3:ΔFx4=(Lt/L) (k4−k2)+k2(k4−k3):−(Lt/L)(k3−k1)−k1

(k4−k3):−(Lt/L)(k4−k2)−k4(k2−k1):(Lt/L)(k3−k1)+k3(k2−k1). As a result, when the vehicle is being driven (is traveling) in any of the states mentioned in (B) to (D) above, or even when the vehicle is driven in a state not included among those mentioned in (B) to (D) above, and the brake/drive forces are revised in order to prevent one of the wheels 1 to 4 from slipping or locking up, correction amounts ΔFx1, ΔFx2, ΔFx3, and ΔFx4 for the brake/drive forces of the wheels 1 to 4 that suppress changes in the longitudinal acceleration, lateral acceleration, and yaw moment about the center of gravity of the vehicle can be calculated with a high degree of precision, Third Embodiment Referring now to FIGS. 11-17, an alternate control program for the controller 8 of the vehicle schematically illustrated in FIG. 1 will now be discussed. In this third embodiment, the drive force distribution system also uses the steering angles of the wheels 1 to 4 in revising the brake/drive forces applied the wheels 1 to 4.

Since only the programming is different between this third embodiment and the prior embodiments, the parts or steps of the second embodiment that are identical to the parts or steps of the first embodiment will be given the same reference numerals as the parts of the first embodiment. Moreover, the descriptions of the parts or steps of the third embodiment that are identical to the parts or steps of the prior embodiments may be omitted for the sake of brevity. In other words, unless otherwise specified, the rest of the configuration of the vehicle in the third embodiment is the same as the configuration of the prior embodiments.

With this embodiment of the present invention the drive force revising section revises the brake/drive forces of the left front wheel, the right front wheel, the left rear wheel, and the right rear wheel by the amounts ΔFx1, ΔFx2, ΔFx3, and ΔFx4, respectively, so as to satisfy the motion requirements of the vehicle, said revisions being based on the steering angles δ1, δ2, δ3, and δ4 of the left front wheel, right front wheel, left rear wheel, and right rear wheel and the sensitivities k1, k2, k3, and k4 estimated by the tire lateral force sensitivity estimating section. Thus, even when the steering angles δi (i=1 to 4) of the wheels are too large to be ignored, in addition to suppressing changes in the longitudinal acceleration of the vehicle, both changes in lateral acceleration resulting from changes in the lateral forces acting on the tires when the brake/drive forces are revised and changes the yaw moment about the center of gravity off the vehicle can be suppressed. As a result, disturbances of the vehicle behavior not intended by the driver can be prevented and the driving performance of the vehicle can be improved.

Figure 11A:
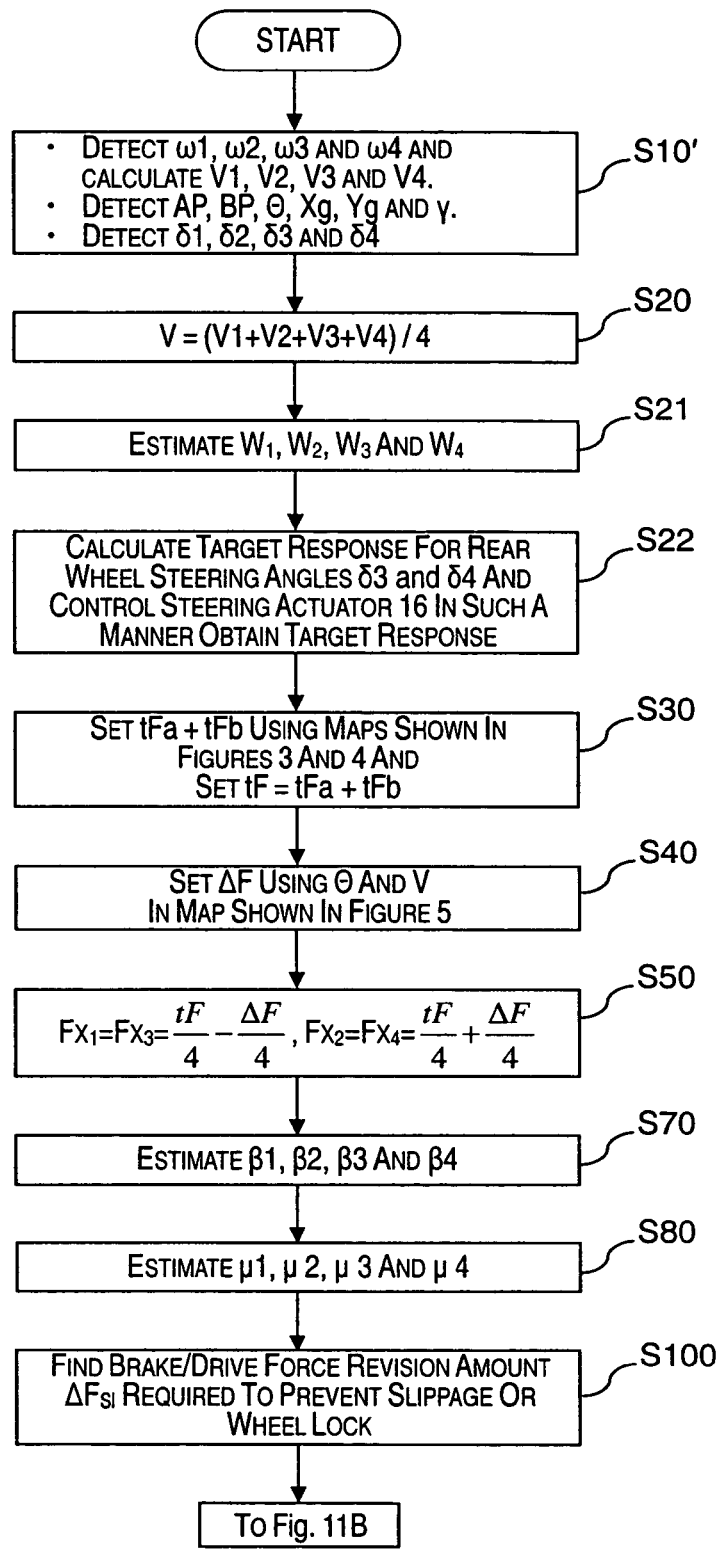
FIG. 11A is a flowchart for the drive force distribution control executed by the controller in a third embodiment.
Figure 11B:
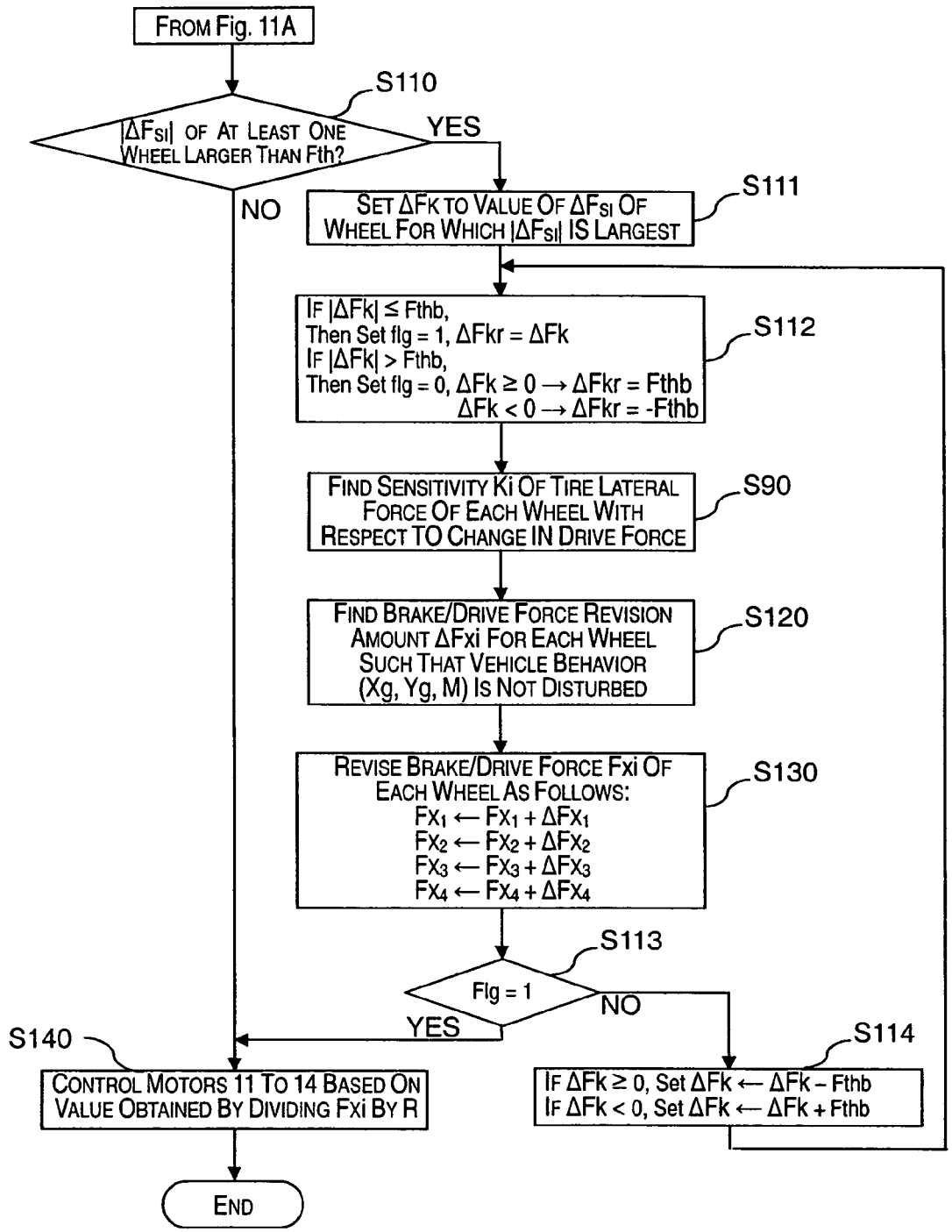
FIG. 11B is a continuation of the flowchart shown in FIG. 11A for the drive force distribution control executed by the controller in the third embodiment.

FIGS. 11A and 11B a flowchart is illustrated showing a routine for computing the torque distribution of the motors 11 to 14 and control the command values issued to the inverters 31 to 34. The routine is executed by the controller 8 once each time a prescribed cycle time elapses. In this embodiment, steps S20 to S70 constitute a brake/drive force determining section that determines the brake/drive force of each wheel based on the motion requirements of the vehicle. In this embodiment, steps S80 to S90 and step S140 constitute a tire lateral force sensitivity estimating section that estimates the sensitivity k1, k2, k3, and k4 of the tire lateral force for each of the wheels 1 to 4 with respect to a change in drive force In this embodiment, steps S100 to S130 constitutes a brake/drive force correction amount determining section for determining the drive force correction amount by which the brake force and/or drive force for each wheel needs to be revised based on factors working to change the brake/drive force determined by the brake/drive force determining section. In this embodiment, steps S150 and S160 constitute a drive force revising section that revises the brake/drive force of each of the wheels 1 to 4 by the amounts ΔFx1, ΔFx2, ΔFx3, and ΔFx4, respectively, based on the steering angles δ1, δ2, δ3, δ4 of the left front wheel, right front wheel, left rear wheel, and right rear wheel and the sensitivities k1, k2, k3, and k4 estimated by the tire lateral force sensitivity estimating section so as to satisfy the motion requirements of the vehicle. The steps of the flowchart will now be described in more detail.

In step S10', the controller 8 is configured to multiply the rotational speed ω1, ω2, ω3, and ω4 (unit: rad/s) for each of the wheels 1 to 4 detected by the wheel speed sensors 21 to 24, respectively, by the radius R of the wheels 1 to 4 to compute velocities V1, V2, V3, and V4 (unit: m/s). The controller 8 also acquires the steering angles δ1, δ2, δ3, δ4 (unit: rad) of the wheels 1 to 4 detected by the steering angle sensors 41 to 44. The controller 8 also reads in the following values: the depression amounts AP (unit: %) of the accelerator pedal 6 and BP (unit: %) of the brake pedal 7 as detected by the accelerator stroke sensor 26 and the brake stroke sensor 27, respectively; the rotation angle θ (unit: rad) of the steering wheel 5 detected by the steering wheel angle sensor 25; the longitudinal acceleration Xg (unit: m/s2) and lateral acceleration Yg (unit: m/s2) of the vehicle detected by the acceleration sensor 100; and the yaw rate γ (unit: rad/s) detected by the yaw rate sensor 101. The speeds V1, V2, V3, and V4 of the wheels 1 to 4 are defined such that a positive value indicates motion in the forward direction of the vehicle. The rotation angle θ of the steering wheel 5 is defined such that a positive valve indicates counterclockwise rotation. The longitudinal acceleration Xg is defined such that a positive value indicates acceleration in the forward direction of the vehicle. The lateral acceleration Yg is defined such that a positive value indicates acceleration from the center of gravity of the vehicle toward the turning center that exists when the vehicle turns left. The yaw rate γ is defined such that a positive value indicates counterclockwise rotation in a top plan view of the vehicle.

Figure 12:
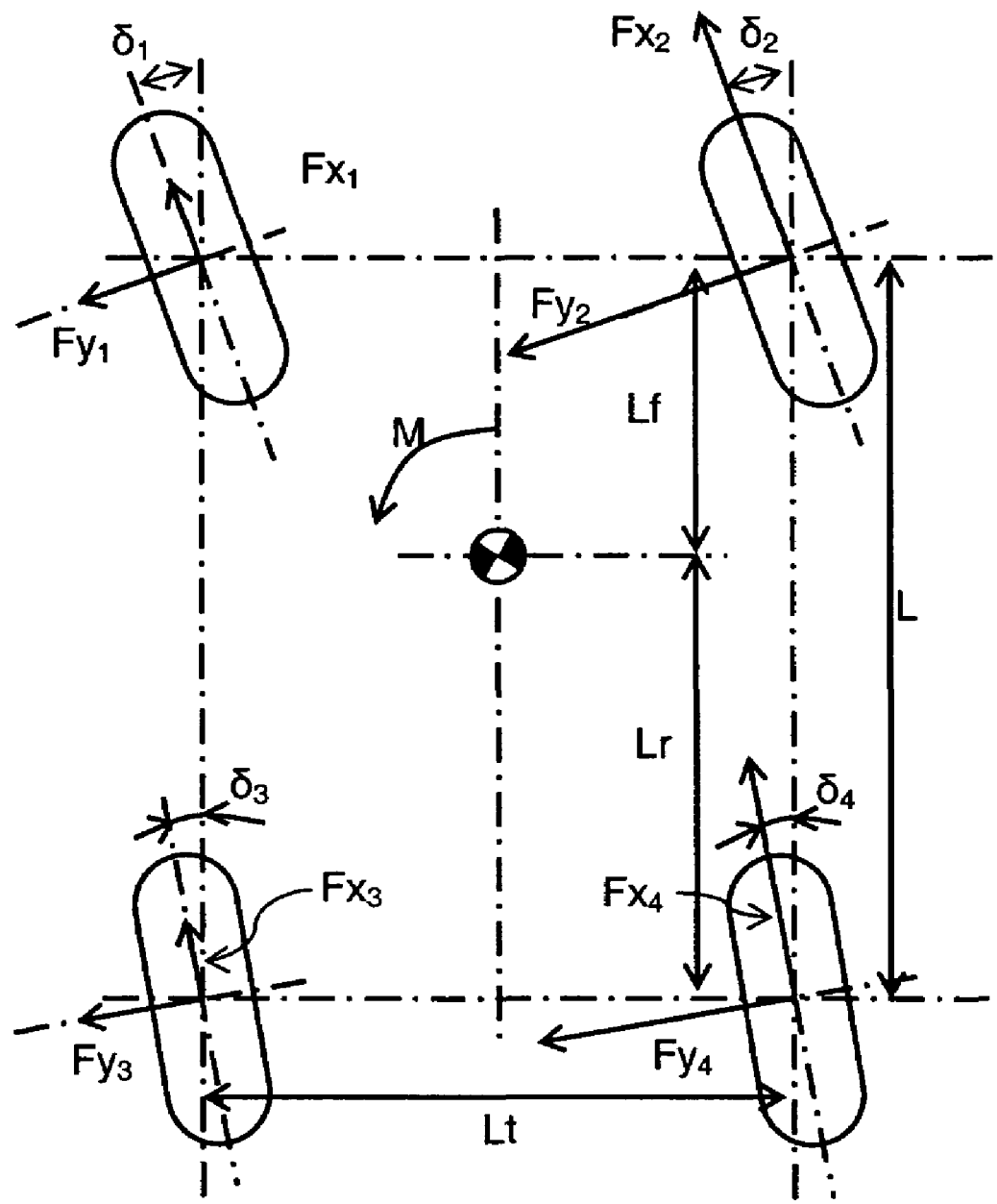
FIG. 12 illustrates the drive force and tire lateral force acting on each wheel of a four wheel independent drive vehicle and the yaw moment acting about the center of gravity the vehicle.

As shown in FIG. 12, the steering angles δ1 to δ4 are defined to be 0 when the direction of the wheels 1 to 4 is aligned with the longitudinal direction of the vehicle body and to be a positive value when the wheels 1 to 4 is turned counterclockwise in a top plan view of the vehicle. Also in FIG. 3, Lf is the distance (unit: m) from the center of gravity position about which the vehicle turns when it undergoes yawing to an axis joining the centers of the front wheels, Lr is the distance (unit: m) from the center of gravity position about which the vehicle turns when it undergoes yawing to an axis joining the centers of the rear wheels, and Lt is the tread length (unit: m) of both the front and rear wheels. The wheelbase length L is equal to the sum of Lf and Lr (i.e., L=Lf+Lr).

In step S20 the controller 8 finds the vehicle speed V (unit: m/s) using the equation (1) mention above in the prior embodiments. The vehicle speed V, too, is defined such its value is positive when the vehicle is moving forward.

In step S21, the controller 8 calculates the wheel load W1, W2, W3, W4 (unit: N) of each of the wheels 1 to 4 using the equations (5') to (8') shown below.

$$W1 = (mLrg/2L) - (mhXg/2L) - (mhYg/2Lt) \tag{5'}$$

$$W2 = (mLrg/2L) - (mhXg/2L) - (mhYg/2Lt) \tag{6'}$$

$$W3 = (mLfg/2L) - (mhXg/2L) - (mhYg/2Lt) \tag{7'}$$

$$W4 = (mLfg/2L) - (mhXg/2L) - (mhYg/2Lt) \tag{8'}$$

In step S22, the controller 8 controls the steering actuator 16 in such a manner that the steering angles δ3 and δ4 respond to the rotation angle (steering wheel angle) θ of the steering wheel 5 as indicated in the equation (48) shown below.

$$\delta 3=\delta 4=(1/16)[k0/(1+TeS)-(Kf/Kr)(TeS/(1+TeS))]\times\theta \quad (48)$$

In the above equation (48), the term $Te=IV/(2LL_fK_f+mL_rV^2)$, while the term $k0=-[L_r+(mL_f/2L_{kr})K_fV^2]/[L_f+(mL_r/2L_{Kf})K_rV^2]$. Also, the term m (unit: kg) is the mass of the vehicle (shown in FIG. 3) in which the control is employed and the term I (unit: $kgm^2$) is the yaw moment of inertia of the vehicle about the center of gravity of vehicle. The terms Kf and Kr (unit: N/rad) are the cornering forces per unit lateral slip angle of the front wheels 1 and 2 and the rear wheels 3 and 4, respectively, when the lateral slip angles of the wheels are sufficiently small. The fraction 1/16 at the left end of the right side of the equation (48) is the sensitivity of the front wheel steering angles δ1 and δ2 with respect to the rotation angle θ of the steering wheel 5.

It is known that setting the target response of the steering angles δ3 and δ4 of the left and right rear wheels 3 and 4 with respect to the rotation angle θ of the steering wheel 5 as indicated in the equation (48) above makes it possible to achieve a negative vehicle body lateral slip angle β when the difference between the brake/drive forces of the left and right wheels is 0 (*Motion and Control of Automobiles*, Chapter 8, Section 8.3.1, by Masato Abe, published by Sankaido Publishing Co., Ltd.).

Next, the controller 8 performs steps S30 to S80 in the same manner as the prior embodiments to set the drive force tF and the drive force difference ΔF, and obtain the values for the brake/drive forces Fx1, Fx2, Fx3, and Fx4, the lateral slip angles β1, β2, β3, β4 and the road surface friction coefficients μ1, μ2, μ3, and μ4. However, in this embodiment, the controller 8 in step S70 estimates the lateral slip angles β1, β2, β3, β4 (unit: rad) for each of the wheels 1 to 4 based on the lateral slip angle β of the vehicle body, which is estimated based on the lateral acceleration Yg, the yaw rate γ, the vehicle speed V, and the steering angles δ1, δ2, δ3, δ4 read in step S10. The lateral slip angles β1, β2, β3, and β4 are then estimated based on the lateral slip angle β, the yaw rate γ, the vehicle speed V, and the steering wheel angle θ as indicated above in the prior embodiments (see, the equations (9) to (11) mentioned above).

In this embodiment, the controller 8 next performs step S100 in the same manner as the prior embodiments to determine the brake/drive force correction amount ΔFsi (i=1 to 4) that will be required to prevent the slippage or wheel lock of each of the wheels 1 to 4 if any of the wheels 1 to 4 is undergoing slippage or wheel lock, or exhibiting a tendency toward slippage or wheel lock.

As in the prior embodiments, the controller 8 next performs step S110 to determine if the absolute value of the brake/drive force correction amount ΔFsi (|ΔFsi|) is larger than a preset threshold value Fth for one or more of wheels 1 to 4. If so, the controller 8 proceeds to step S111. If not, the controller 8 proceeds to step S140 as in the prior embodiments.

In step S111, in anticipation of a situation in which the brake/drive force of more than one of the wheels 1 to 4 requires revising, the controller 8 assigns the name ΔFk to the brake/drive force correction amount ΔFsi of the wheel for which the absolute value of the brake/drive force correction amount ΔFsi (|ΔFsi|) is the largest.

In steps between S111 and S113 (discussed later), the controller 8 calculates a brake/drive force correction amount Fxi (i=1 to 4) for each of the wheels 1 to 4. The brake/drive force correction amounts Fxi are contrived to remedy the slipping or locked state of the wheels 1 to 4 where the absolute value of the brake/drive force correction amount ΔFsi, i.e., |ΔFsi|, is the largest without disturbing the behavior of the vehicle (i.e., the longitudinal acceleration Xg, the lateral acceleration Yg, and the yaw moment M about the center of gravity of the vehicle).

In step S112, the controller 8 determines if the absolute value of ΔFk is equal to or less than a threshold value Fthb as in the second embodiment. If so, the controller 8 sets the value of a flag flg to 1 and sets the value of ΔFkr to the value of ΔFk. If the absolute value of ΔFk is larger than the threshold value Fthb, the controller 8 sets the flag flg to 0 and sets the value of ΔFkr to Fthb if ΔFk is equal to or larger than 0 and to −Fthb if ΔFk is less than 0.

The flag flg and the threshold value Fthb will now be described. When the brake/drive force of one wheel changes or is changed deliberately, the equation (49) (presented later) can be used to find brake/drive force correction amounts ΔFxi for the remaining three wheels that will not disturb the behavior of the vehicle. However, the equation (49) is based on the assumption that the amount of change in the brake/drive force of each wheel is very small (small enough to be considered infinitesimal). Thus, when ΔFk is too large to be considered infinitesimal, it is difficult to calculate the brake/drive force correction amounts ΔFxi for the remaining three wheels accurately using the equation (49). The flag flg is used to indicate whether the controller has determined that ΔFk is too large or not; the flag flg is set to 0 when ΔFk is too large to be considered infinitesimal and the flag flg is set to 1 when ΔFk is small enough to be considered infinitesimal.

The threshold value Fthb is the absolute value of the maximum amount of change in the brake/drive force that can be assumed to be infinitesimal. When ΔFk is larger than the threshold value Fthb, the brake/drive force of the wheel for which the absolute value of ΔFsi (i.e., |ΔFsi|) is largest is assumed to have changed by an amount equal to Fthb and the brake/drive forces Fxi of the wheels are revised accordingly in steps S120 and S130 (described later). Meanwhile, the value of ΔFk is revised to the value ΔFk−ΔFthb (i.e., if ΔFx is equal to or larger than 0 in step S132).

This processing is repeated until ΔFk becomes small enough to be considered infinitesimal, i.e., until the condition |ΔFkr|<Fthb is satisfied. In this way, even if ΔFk is too large to be considered infinitesimal, the brake/drive force correction amounts ΔFxi of the remaining three wheels can be obtained. In this embodiment, the threshold value Fthb is set to 4% of the vehicle weight W (unit: N), i.e., 0.04 W.

In step S90, the controller 8 finds the sensitivity ki (i=1 to 4) of the tire lateral force of each of the wheels 1 to 4 with respect to a change in drive force based on the wheel load Wi, the lateral slip angle βi, and the road surface friction coefficient μi (i=1 to 4) estimated in steps S21 to S80. The method of calculating the sensitivity ki of the tire lateral force can be the same as in the prior embodiments as an example.

In step S120, a brake/drive force correction amount ΔFxi (i=1 to 4) is calculated for each of the wheels 1 to 4 using the equation (49) shown below. The brake/drive force correction amounts ΔFxi are contrived to remedy the slipping or locked state of the wheels 1 to 4 where the absolute value of the brake/drive force correction amount ΔFsi, i.e., |ΔFsi|, is the largest without disturbing the behavior of the vehicle (i.e., the longitudinal acceleration Xg, the lateral acceleration Yg, and the yaw moment M about the center of gravity of the vehicle).

$$\Delta Fx1 : \Delta Fx2 : \Delta Fx3 : \Delta Fx4 = \frac{[(Lt/L)(h4-h2)+h2(h4-h3)]}{(\cos \delta 1 - k1 \sin \delta 1)} : \frac{[(-Lt/L)(h3-h1)-h1(h4-h3)]}{(\cos \delta 2 - k2 \sin \delta 2)} : \qquad (49)$$
$$\frac{[(-Lt/L)(h4-h2)+h4(h2-h1)]}{(\cos \delta 3 - k3 \sin \delta 3)} : \frac{[(Lt/L)(h3-h1)+h3(h2-h1)]}{(\cos \delta 4 - k4 \sin \delta 4)}$$

In the equation (49), hi=(sin δi+ki cos δi)/(cos δi−ki sin δi). If the ratios of the brake/drive force correction amounts Fxi of the wheels 1 to 4 are made to satisfy the equation (49), the changes in the longitudinal acceleration Xg, the lateral acceleration Yg, and the yaw moment M about the center of gravity of the vehicle can suppressed (reduced).

Thus, for example, if the absolute value of brake/drive force correction amount ΔFs1 of the left front wheel 1 is larger than the absolute values of the brake/drive force correction amounts ΔFs2, ΔFs3, and ΔFs4 of the other wheels, then the brake/drive force correction amount of ΔFx1, ΔFx2, ΔFx3, and ΔFx4 for each of the wheels 1 to 4 is calculated using the equations (50) to (53) below based on the sensitivities k1 to k4 of the tire lateral forces of the wheels 1 to 4 with respect to a change in the brake/drive force.

$$\Delta Fx1 = \Delta Fkr \qquad (50)$$

$$\Delta Fx2 = \qquad (51)$$
$$\left\{ \frac{[(-Lt/L)(h3-h1)+h1(h4-h3)]}{[(Lt/L)(h4-h2)+h2(h4-h3)]} \right\} \times \left[ \frac{(\cos \delta 1 - k1 \sin \delta 1)}{(\cos \delta 2 - k2 \cos \delta 2)} \right] \times \Delta Fkr$$

$$\Delta Fx3 = \qquad (52)$$
$$\left\{ \frac{[(-Lt/L)(h4-h2)+h4(h2-h1)]}{[(Lt/L)(h4-h2)+h2(h4-h3)]} \right\} \times \left[ \frac{(\cos \delta 1 - k1 \sin \delta 1)}{(\cos \delta 3 - k3 \cos \delta 3)} \right] \times \Delta Fkr$$

$$\Delta Fx4 = \qquad (53)$$
$$\left\{ \frac{[(Lt/L)(h3-h1)+h3(h2-h1)]}{[(Lt/L)(h4-h2)+h2(h4-h3)]} \right\} \times \left[ \frac{(\cos \delta 1 - k1 \sin \delta 1)}{(\cos \delta 4 - k4 \cos \delta 4)} \right] \times \Delta Fkr$$

In this embodiment, the steering angles δ1, δ2, δ3, δ4 of the wheels 1 to 4 are measured directly in step S10' and used in the equation (49) to calculate the drive force correction amounts Fxi for the wheels 1 to 4. This approach is used so that the drive force correction amounts Fxi will be calculated in a manner that takes into account changes in the steering angles that result from the brake/drive forces and tire lateral forces of the wheels 1 to 4 acting on the suspension (i.e., compliance steering, roll steering, etc.). If the vehicle does not possess a section of detecting the steering angles δi of the wheels 1 to 4 directly and is, instead, equipped to estimate the steering angles δi based on the rotation angle θ of the steering wheel 5 and steering gear ratio, the drive force correction amounts ΔFxi for the wheels 1 to 4 can be calculated with a high degree of precision by estimating the amounts of change in the steering angles δi based on the suspension characteristics of the vehicle and revising the estimated values of the steering angles δi in accordance with the estimated amounts of change.

Next, the controller 8 performs step 130 in the same manner as the prior embodiments using equations (24) to (27) as mentioned above.

In step S113, the controller 8 checks if the value of the flag flg is 1. If so, the controller 8 proceeds to step S140. If not, the controller proceeds to step S114, where it changes the value of ΔFk to the value ΔFk−Frhb (ΔFk←ΔFk−Frhb) if ΔFk is larger than 0 or to ΔFk+Fthb (ΔFk←ΔFk+Frhb) if ΔFk is smaller than 0, and then returns to step S112.

In step S140, as in the prior embodiments, the electric current command values issued to the inverters 31 to 34 are controlled such that the output torque of each of the motors 11 to 14 is adjusted to the value obtained by dividing the new brake/drive force Fxi of each of the wheels 1 to 4 by the tire radius R, i.e., the torque command value for that motor.

As previously stated, the system presented in the first embodiment is configured such that if the brake/drive force of one of the wheels 1 to 4 changes, the drive force correction amounts for the other three wheels are found in such a manner that the amounts of change in the longitudinal acceleration, the lateral acceleration, and the yaw moment about the center of gravity of the vehicle are all 0. However, the technology presented in first embodiment is based on the assumption that the steering angles δ of the wheels 1 to 4 are small enough to be ignored. When the steering angles δi of some or all of the four wheels 1 to 4 are large, e.g., when the vehicle is turning and the steering angles δ1, δ2 of the front wheels are large, the assumption made in said previous application does not hold up and, should the brake/drive force of one wheel change, it may not be possible to calculate drive force correction amounts for the other three wheels that can prevent changes in the longitudinal acceleration, lateral acceleration, and yaw moment about the center of gravity of the vehicle.

Conversely, by calculating the drive force correction amounts ΔFxi (I=1 to 4) of the wheels 1 to 4 based on the equation (49) proposed in step S120 of this embodiment, even if the steering angles δi of the wheels 1 to 4 are large, drive force correction amounts that do not disturb the behavior of the vehicle (i.e., the longitudinal acceleration Xg, the lateral acceleration Yg, and the yaw moment M about the center of gravity of the vehicle), i.e., that do not change the longitudinal and lateral accelerations of the vehicle or the yaw moment about the center of gravity of the vehicle, can be found for the wheels 1 to 4.

The basis for the claim that calculating the brake/drive force correction amount ΔFxi (i=1 to 4) for each of the wheels 1 to 4 based on the equation (49) proposed in step S120 does not disturb the behavior of the vehicle (i.e., the longitudinal acceleration Xg, the lateral acceleration Yg, and the yaw moment M about the center of gravity of the vehicle), even if the steering angles δi of the wheels 1 to 4 are large, will now be explained. In short, by calculating the drive force correction amounts for the wheels 1 to 4 as described below, even if the steering angles δi of the wheels 1 to 4 are large, the longitudinal acceleration, the lateral acceleration, and the yaw moment about the center of gravity of the vehicle can be substantially prevented from changing.

First, a method of finding drive force correction amounts ΔFxi that change neither the longitudinal and lateral accelerations Xg and Yg nor the yaw moment M about the center of gravity of the vehicle, the method being contrived to take into account the steering angles δi of the wheels 1 to 4, will be described with reference to FIG. 12. FIG. 12 illustrates the drive forces, lateral forces, and yaw moment about the center of gravity of the vehicle that act on a four wheel independent drive vehicle. The changes in the wheel alignment and the steering angles of the wheels that result from forces acting on the suspension of the vehicle shown in FIG. 12 are assumed to be negligible and the suspension characteristics are ignored.

Figure 13:
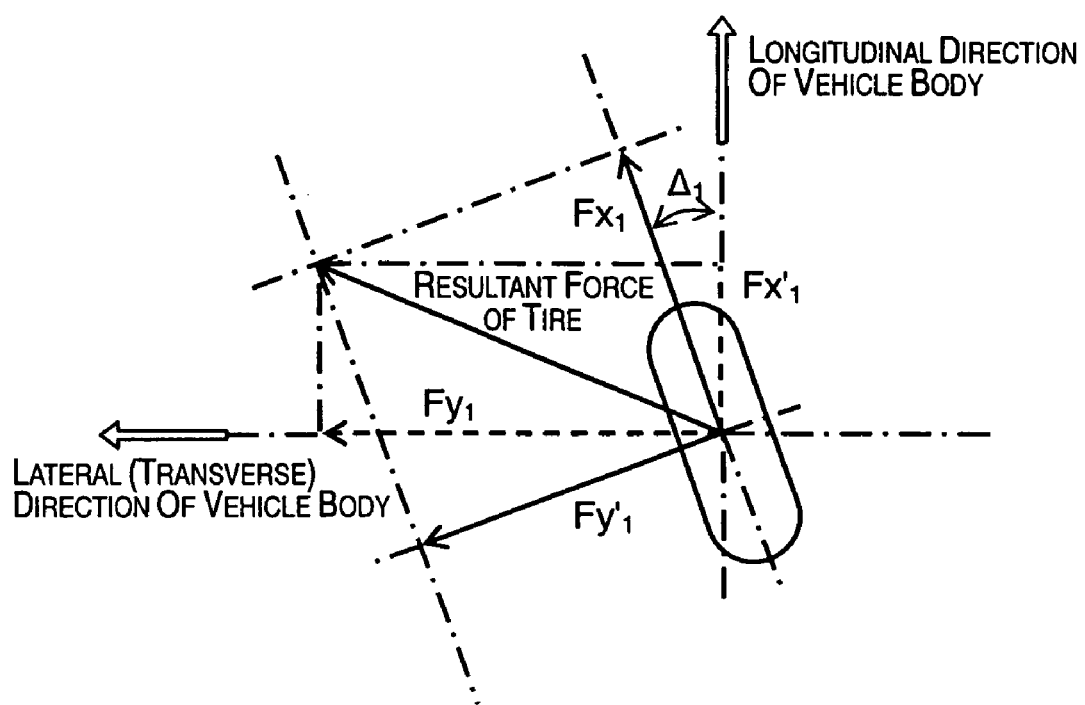
FIG. 13 illustrates the longitudinal component and lateral component of the resultant tire force acting on a wheel turned to a steering angle $\delta i$ (i=1 to 4)

When the wheels are turned to steering angles δi (I=1 to 4) as shown in FIG. 13, the longitudinal component Fx'i of the tire force (component oriented in the longitudinal direction of the vehicle body) and the lateral component Fy'i of the tire force (component oriented in the transverse direction of the vehicle body) are expressed as shown in the equations (54) and (55) below.

$$Fx'i = Fxi \cos \delta i - Fyi \sin \delta i \tag{54}$$

$$Fy'i = Fxi \sin \delta i - Fyi \cos \delta i \tag{55}$$

The longitudinal component Fx'i is defined to have a positive value when oriented in the forward direction of the vehicle body and the lateral component Fy'i is defined to have a positive value when oriented from the center of gravity of the vehicle toward the turning center that exists when the vehicle turns left.

Thus, assuming ΔFyi is the amount of change in the tire lateral force that results when the brake/drive force changes by an amount ΔFxi, the longitudinal component Fx'i and the lateral component Fy'i of the resultant tire force are expressed as shown in the equations (56) and (57) below.

$$\Delta Fx'i = \Delta Fxi \cos \delta i - \Delta Fyi \sin \delta i \tag{56}$$

$$\Delta Fy'i = \Delta Fxi \sin \delta i - \Delta Fyi \cos \delta \tag{57}$$

Since the sensitivity ki of the tire lateral force with respect to a very small (substantially infinitesimal) change ΔFxi in the brake/drive force under conditions of the current brake/drive force Fxi and tire lateral force Fyi acting on the wheels 1 to 4 is defined as shown in FIG. 8 and the equation (34), the amount of change ΔFyi in the tire lateral force can be estimated as follows: ΔFyi=ki ΔFxi. Thus, the longitudinal component Fx'i and the lateral component Fy'i can be expressed as shown in equations (58) and (59) below using the sensitivity ki.

$$\Delta Fx'i = (\cos \delta i - ki \sin \delta i)\Delta Fxi = pi\, \Delta Fxi\, (pi = \cos \delta i - ki \sin \delta i) \tag{58}$$

$$\Delta Fy'i = (\sin \delta i + ki \cos \delta i)\Delta Fxi = qi\, \Delta Fxi\, (qi = \sin \delta i + ki \cos \delta i) \tag{59}$$

When the wheels 1 to 4 are turned to steering angles δi as shown in FIG. 3, the total longitudinal component Fx of the tire forces, the total lateral component Fy of the tire forces, and the total yaw moment M about the center of gravity of the vehicle generated by the sum total of the tire forces acting on the wheels 1 to 4 can be expressed according to the equations (60) to (62) shown below.

$$Fx = Fx'1 + Fx'2 + Fx'3 + Fx'4 \tag{60}$$

$$Fy = Fy'1 + Fy'2 + Fy'3 + Fy'4 \tag{61}$$

$$M = [(Fx'2 + Fx'4) - (Fx'1 + Fx'3)]Lt/2 + [(Fy'1 + Fy'2) \times Lf - (Fy'3 + Fy'4) \times Lr] \tag{62}$$

The total yaw moment M is defined to be positive when it is oriented in the counterclockwise direction in a top plan view of the vehicle, as shown in FIG. 3.

Thus, if the brake/drive force Fxi of each of the wheels 1 to 4 changes by a correction amount ΔFxi, then the amounts of change ΔFx, ΔFy, and ΔM in the brake/drive force Fx, the tire lateral force Fy, and yaw moment M, respectively, can be expressed according to the equations (63) to (65) shown below using the same pi and qi as are used in equations (58) and (59).

$$\Delta Fx = \Delta Fx'1 + \Delta Fx'2 + \Delta Fx'3 + \Delta Fx'4 = p1\Delta Fx1 + p2\Delta Fx2 + p3\Delta Fx3 + p4\Delta Fx4 \tag{63}$$

$$\Delta Fy = \Delta Fy'1 + \Delta Fy'2 + \Delta Fy'3 + \Delta Fy'4 = q1\Delta Fx1 + q2\Delta Fx2 + q3\Delta Fx3 + q4\Delta Fx4 \tag{64}$$

$$\begin{aligned}\Delta M &= [(\Delta Fx'2 + \Delta Fx'4) - (\Delta Fx'1 + \Delta Fx'3)]Lt/2 + \\ &\quad [(\Delta Fy'1 + \Delta Fy'2) \times Lf - (\Delta Fy'3 + \Delta Fy'4) \times Lr] \\ &= [-(p1\, Lt/2) + q1Lf]\Delta Fx1 + [(p2\, Lt/2) + q2Lf]\Delta Fx2 + \\ &\quad [-(p3\, Lt/2) - q3Lf]\Delta Fx3 + [(p4\, Lt/2) - q4\, Lf]\Delta Fx4\end{aligned} \tag{65}$$

The equations (63), (64), and (65) can be combined (rearranged) into the equation (66) below.

$$\begin{bmatrix} \Delta Fx \\ \Delta Fy \\ \Delta M \end{bmatrix} = \begin{bmatrix} p_1 & p_2 & p_3 & p_4 \\ q_1 & q_2 & q_3 & q_4 \\ -\frac{p_1 Lt}{2} + q_1 Lf & \frac{p_2 Lt}{2} + q_2 Lf & -\frac{p_3 Lt}{2} - q_3 Lr & \frac{p_4 Lt}{2} - q_4 Lr \end{bmatrix} \begin{bmatrix} \Delta Fx_1 \\ \Delta Fx_2 \\ \Delta Fx_3 \\ \Delta Fx_4 \end{bmatrix} \tag{66}$$

By setting the left side of the equation (66) to all zeros, i.e., by setting the amounts of change ΔFx and ΔFy, and ΔM in the brake/drive force Fx, tire lateral force Fy, and yaw moment M, respectively, to 0 as shown in the equation (67) below, the following equations (68) to (70) for the brake/drive force correction amounts ΔFx2, ΔFx3, and ΔFx4 of the other wheels 2 to 4 can be obtained by solving the simultaneous equations expressed by the matrix equation (67) for the brake/drive force correction amounts ΔFx2, ΔFx3, and ΔFx4 of the other wheels 2 to 4 and using the drive force correction amount ΔFx1 of the left front wheel 1.

$$\begin{bmatrix} 0 \\ 0 \\ 0 \end{bmatrix} = \begin{bmatrix} p_1 & p_2 & p_3 & p_4 \\ q_1 & q_2 & q_3 & q_4 \\ -\frac{p_1 Lt}{2} + q_1 Lf & \frac{p_2 Lt}{2} + q_2 Lf & -\frac{p_3 Lt}{2} - q_3 Lr & \frac{p_4 Lt}{2} - q_4 Lr \end{bmatrix} \begin{bmatrix} \Delta Fx_1 \\ \Delta Fx_2 \\ \Delta Fx_3 \\ \Delta Fx_4 \end{bmatrix} \tag{67}$$

$$\Delta Fx2 = \frac{[q1(p4q3 - p3q4)L + p4(p3q1 - p1q3)Lt]}{[q2(p3q4 - p4q3)L + p3(p2q4 - p4q2)Lt]} \times \Delta Fx1 \tag{68}$$

$$\Delta Fx3 = \frac{[q4(p2q1 - p1q2)L + p1(p4q2 - p2q4)Lt]}{[q2(p3q4 - p4q3)L + p3(p2q4 - p4q2)Lt]} \times \Delta Fx1 \tag{69}$$

-continued $$\Delta Fx4 = \frac{[q3(p1q2 - p2q1)L + p2(p1q3 - p3q1)Lt]}{[q2(p3q4 - p4q3)L + p3(p2q4 - p4q2)Lt]} \times \Delta Fx1 \quad (70)$$

Thus, since the equations (68) to (70) correspond to a case in which the amounts of change ΔFx and ΔFy, and ΔM of the brake/drive force Fx, tire lateral force Fy, and yaw moment M are each equal to 0, it should be clear that when the ratios of the drive force correction amounts ΔFx1, ΔFx2, ΔFx3, and ΔFx4 satisfy the aforementioned equation (49), there is zero change in the brake/drive force Fx, the tire lateral force Fy, and the yaw moment M.

$$\Delta Fx1 : \Delta Fx2 : \Delta Fx3 : \Delta Fx4 = q2(p3q4 - p4q3)L + p3(p2q4 - \quad (49)$$
$$p4q2)Lt : q1(p4q3 - p3q4)L +$$
$$p4(p3q1 - p1q3)Lt : q4(p2q1 -$$
$$p1q2)L + p1(p4q2 - p2q4)Lt :$$
$$q3(p1q2 - p2q1)L + p2(p1q3 - p3q1)Lt$$
$$= \frac{[(Lt/L)(h4 - h2) + h2(h4 - h3)]}{(\cos \delta1 - k1 \sin \delta1)} :$$
$$\frac{[(-Lt/L)(h3 - h1) - h1(h4 - h3)]}{(\cos \delta2 - k2 \sin \delta2)} :$$
$$\frac{[(-Lt/L)(h4 - h2) + h4(h2 - h1)]}{(\cos \delta3 - k3 \sin \delta3)} :$$
$$\frac{[(Lt/L)(h3 - h1) + h3(h2 - h1)]}{(\cos \delta4 - k4 \sin \delta4)}$$

$$hi = (\sin \delta i + ki \cos \delta i)/(\cos \delta i - ki \sin \delta i)$$

Thus, when the brake/drive force of one of the wheels 1 to 4 changes due to such a factor as slippage or motor trouble or when the brake/drive force of one of the wheels is changed deliberately, brake/drive force change amounts ΔFxi of the remaining three wheels can be found that will cause zero change to occur in the longitudinal component Fx of the total tire force, the lateral component Fy of the total tire force, and the total yaw moment M about the center of gravity of the vehicle resulting from the tire forces by setting the brake/drive force change amounts ΔFxi such that the ratios thereof satisfy the aforementioned equation (49). This is effective even when the steering angles δi of the wheels are too large to be ignored.

The calculation of the brake/drive force correction amounts ΔFxi of the wheels in step S120 in a case where the brake/drive force revision values ΔFsi are sufficiently small (i.e., the value of the flag flg is 1) and the drive force distributions of the wheels 1 to 4 are set in steps S40 and S50 according to the wheel load ratios as shown in the equations (71) to (74) below using the wheel loads found in step S30.

$$Fx1 = [W1/(W1+W2+W3+W4)] \times tF \quad (71)$$

$$Fx2 = [W2/(W1+W2+W3+W4)] \times tF \quad (72)$$

$$Fx3 = [W3/(W1+W2+W3+W4)] \times tF \quad (73)$$

$$Fx4 = [W4/(W1+W2+W3+W4)] \times tF \quad (64)$$

If the roll (suspension characteristics) of the vehicle body are ignored and the vehicle is assumed to be traveling at a constant speed in a horizontal plane, then the slip angles β1 and β2 of the left and right front wheels 1 and 2 can be assumed to be approximately equal to each other and the slip angles β3 and β4 of the left and right rear wheels 3 and 4 can be assumed to be approximately equal to each other because the steering angles δ1 and β2 of the left and right front wheels 1 and 2 and the steering angles δ3 and δ4 of the left and right rear wheels 3 and 4 are equal. (See *Motion and Control of Automobiles*, Chapter 3, Section 3.2.1, by Masato Abe, published by Sankaido Publishing Co., Ltd.).

As can be understood from FIGS. 6 and 8, the relationship between the drive force and the tire lateral force can be approximated as an ellipse, as shown in FIG. 10. The long radius of the ellipse corresponding to each of the wheels 1 to 4 is equal to the product of the wheel load Wi and the road surface friction coefficient μi, i.e., Wi×μi. The short radius of each ellipse can also be approximated to change substantially proportionally to the wheel load Wi and the road surface friction coefficient μi.

When the slip angles of the left and right wheels are equal, the ellipses corresponding to the left and right wheels are substantially similar in shape, as shown in FIG. 10 regarding the left and right front wheels 1 and 2. In such a case, if the drive force distribution to the left and right wheels is set such that the ratio of the drive forces is equal to the ratio of the wheel loads, then the sensitivities ki of the tire lateral forces of the left and right wheels with respect to changes in the drive forces of the left and right wheels will also be equal, i.e., the following approximations can be made regarding the sensitivities of the wheels 1 to 4: k1=k2 and k3=k4.

In this state, the ratio of the drive force with respect to the long radius of the tire friction circle (ellipse) is the same for both the left and right front tires and for the left and right rear wheels. That is, the brake/drive forces are distributed such that the loads carried by the left and right front wheels are balanced and the loads carried the left and right rear wheels are balanced. Since the combined force (resultant friction force) resulting from the drive force and the tire lateral force acting on the surface of each tire that contacts the ground generally does not exceed the wheel load of the tire, the fact that the combined force (resultant friction forces) resulting from the drive force and the tire lateral force acting on each tire corresponds to the respective wheel load serves to balance the load born by the left and right wheels. In short, the vehicle is traveling with a drive force distribution that does not easily allow wheel slippage or wheel lock of one of the left or right wheels to occur.

When the vehicle is traveling in this state (Traveling State 1), the approximations δ1=β2 and δ3=δ4 can be made regarding the steering angles of the wheels 1 to 4 and the approximations k1=k2 and k3=k4 can be made regarding the sensitivities of the wheels 1 to 4. As a result, in step S150, brake/drive force correction amounts ΔFx1, ΔFx2, ΔFx3, and ΔFx4 that do not disturb the longitudinal acceleration Xg, the lateral acceleration Yg, and the yaw moment M (about the center of gravity of the vehicle) can be obtained by setting the brake/drive force correction amounts ΔFx1, ΔFx2, ΔFx3, and ΔFx4 of the wheels 1 to 4 in such a manner that the ratios thereof satisfy the equation (75) shown below. In other words, by satisfying the equation (75), correction amounts ΔFx1, ΔFx2, ΔFx3, and ΔFx4 for the brake/drive forces of the wheels 1 to 4 that suppress changes in the longitudinal acceleration, lateral acceleration, and yaw moment about the center of gravity of the vehicle can be calculated with a higher degree of precision.

$$\Delta Fx1 : \Delta Fx2 : \Delta Fx3 : \Delta Fx4 = (\cos \delta3 - k3 \sin \delta3) : -(\cos \delta3 - k3 \sin \delta3) : -(\cos \delta1 - k1 \sin \delta1) : (\cos \delta1 - k1 \sin \delta1) \quad (75)$$

More specifically, when the vehicle is traveling in Travel State 1, since the approximations δ1=δ2 and δ3=δ4 can be made regarding the steering angles $\delta i$ of the wheels 1 to 4 and the approximations k1=k2 and k3=k4 can be made regarding the sensitivities ki of the wheels 1 to 4, these approximations can be substituted into the equation (20) as indicated in the equations (76) and (77) below.

$$h1 = h2 = (\sin \delta 1 + k1 \cos \delta 1)/(\cos \delta 1 - k1 \sin \delta 1), \quad (76)$$

$$h3 = h4 = (\sin \delta 3 + k3 \cos \delta 3)/(\cos \delta 3 - k3 \sin \delta 3)$$

$$(\because \delta 1 = \delta 2, \delta 3 = \delta 4, k1 = k2, \text{ and } k3 = k4)$$

$$\Delta Fx1:\Delta Fx2:\Delta Fx3:\Delta Fx4 = \frac{[(Lt/L)(h4-h2) + h2(h4-h3)]}{(\cos \delta 1 - k1 \sin \delta 1)}: \quad (77)$$

$$\frac{[(-Lt/L)(h3-h1) - h1(h4-h3)]}{(\cos \delta 2 - k2 \sin \delta 2)}:$$

$$\frac{[(Lt/L)(h3-h1) + h3(h2-h1)]}{(\cos \delta 4 - k4 \sin \delta 4)}$$

$$= \frac{[(Lt/L)(h3-h1) + h1(h3-h3)]}{(\cos \delta 1 - k1 \sin \delta 1)}:$$

$$\frac{[(-Lt/L)(h3-h1) - h1(h3-h3)]}{(\cos \delta 1 - k1 \sin \delta 1)}:$$

$$\frac{[(-Lt/L)(h3-h1) + h3(h1-h1)]}{(\cos \delta 3 - k3 \sin \delta 3)}:$$

$$\frac{[(Lt/L)(h3-h1) + h3(h1-h1)]}{(\cos \delta 3 - k3 \sin \delta 3)}$$

$$= \frac{1}{(\cos \delta 1 - k1 \sin \delta 1)}: \frac{-1}{(\cos \delta 1 - k1 \sin \delta 1)}:$$

$$\frac{-1}{(\cos \delta 3 - k3 \sin \delta 3)}: \frac{1}{(\cos \delta 3 - k3 \sin \delta 3)}$$

$$= (\cos \delta 3 - k3 \sin \delta 3): -$$

$$(\cos \delta 3 - k3 \sin \delta 3):$$

$$-(\cos \delta 1 - k1 \sin \delta 1):(\cos \delta 1 - k1 \sin \delta 1)$$

$$(\because \delta 1 = \delta 2, \delta 3 = \delta 4, k1 = k2, k3 = k4, h1 = h2, \text{ and } h3 = h4)$$

As can also be understood from FIGS. 6 and 8, when the slip angles $\delta i$ of the wheels 1 to 4 are large and the brake/drive forces can be approximated as 0 or when the slip angles $\delta i$ of the wheels 1 to 4 are small (in which case the sizes of the brake/drive forces is irrelevant), the steering angles $\delta i$ of the wheels 1 to 4 have the relationships $\delta 1=\delta 2$ and $\delta 3=\delta 4$ and the sensitivities ki of the wheels 1 to 4 can be approximated as k1=k2=k3=0. Such a traveling state can occur, for example, when the vehicle is traveling in a straight line and the slip angles $\delta i$ of the wheels 1 to 4 are sufficiently small or when the vehicle is turning such that the slip angles $\delta i$ of the wheels 1 to 4 are large and the vehicle is moving at a constant speed or with a slight deceleration such that the brake/drive forces of the wheels 1 to 4 are very small.

When the vehicle is traveling in this state (Traveling State 2), brake/drive force correction amounts $\Delta Fx1$, $\Delta Fx2$, $\Delta Fx3$, and $\Delta Fx4$ that do not disturb the longitudinal acceleration Xg, the lateral acceleration Yg, and the yaw moment M (about the center of gravity of the vehicle) can be obtained easily in step S150 by setting the brake/drive force correction amounts $\Delta Fx1$, $\Delta Fx2$, $\Delta Fx3$, and $\Delta Fx4$ of the wheels 1 to 4 in such a manner that the ratios thereof are as follows: $\cos \delta 3:-\cos \delta 3:-\cos \delta 1:\cos \delta 1$. This relationship allows the amount of memory and processing required of the computer (controller 8) used for the computations to be reduced. With this relationship, the sums of the drive force correction amounts for the left and right front wheels and for the left and right rear wheels are substantially 0 and the larger the steering angles $\delta 1$ and $\delta 2$ of the front wheels 1 and 2 become with respect to the steering angles $\delta 3$ and $\delta 4$ of the rear wheels 3 and 4, the smaller the drive force correction amount $\Delta Fx4$ of the right rear wheel 4 becomes with respect to the drive force correction amount $\Delta Fx1$ of the left front wheel 1.

More specifically, when approximations $\delta 1=\delta 2$ and $\delta 3=\delta 4$ can be made regarding the steering angles $\delta i$ of the wheels 1 to 4 and the approximations k1=k2=k3=k4=0 can be made regarding the sensitivities ki of the wheels 1 to 4, these approximations can be substituted into the equation (49) as indicated in the equation (78) below.

$$\begin{aligned}\Delta F \times 1 : \Delta F \times 2 : \\ \Delta F \times 3 : \Delta F \times 4\end{aligned} = 1 : -1 : -(\cos \delta 1 - k1 \sin \delta 1)/ \quad (78)$$

$$(\cos \delta 3 - k3 \sin \delta 3):$$

$$(\cos \delta 1 - k1 \sin \delta 1)/(\cos \delta 3 - k3 \sin \delta 3)$$

$$= 1 : -1 : -\cos \delta 1/\cos \delta 3 : \cos \delta 1/\cos \delta 3$$

$$= \cos \delta 3 : -\cos \delta 3 : -\cos \delta 1 : \cos \delta 1$$

$$(\because k1 = k2 = k3 = k4 = 0)$$

Based on this equation (78), it should be clear that as the absolute value of the steering angles $\delta 1$ and $\delta 2$ ($\delta 1=\delta 2$) of the left and right front wheels 1 and 2 increases with respect to the absolute value of the steering angles $\delta 3$ and $\delta 4$ ($\delta 3=\delta 4$) of the left and right rear wheels 3 and 4, the absolute value of the brake/drive force correction amount $\Delta Fx4$ of the right rear wheel 4 decreases with respect to the absolute value of the brake/drive force correction amount $\Delta Fx1$ of the left front wheel 1.

Another embodiment can be obtained by applying the invention to a vehicle that does not have a rear wheel steering mechanism (steering actuator 16), i.e., a vehicle configured such that only the front wheels can be steered (turned). In such a case, the values of the steering angles $\delta 3$ and $\delta 4$ of the rear wheels 3 and 4 can be assumed to be fixed (normally at $\delta 3=\delta 4=0$). If a vehicle configured in this manner (i.e., such that only the front wheels 1 and 2 can be steered) is controlled based on FIGS. 1 to 10 and the drive force distributions of the wheels 1 to 4 are calculated according to the equations (71) to (74) in steps S40 and S50 as described above, then in step S120 the brake/drive force correction amounts $\Delta Fxi$ of the wheels 1 to 4 can be calculated as will now be described when a slight amount of slippage occurs (i.e., when the flag flg has a value of 1).

More specifically, a third vehicle traveling state, Traveling State 3, can be defined by adding to the aforementioned Traveling State 1 (i.e., a state in which the approximations $\delta 1=\delta 2$ and $\delta 3=\delta 4$ can be made regarding the steering angles $\delta i$ of the wheels 1 to 4 and the approximations k1=k2 and k3=k4 can be made regarding the sensitivities ki of the wheels 1 to 4) the following conditions: the steering angles $\delta i$ of the left and right rear wheels are zero ($\delta 3=\delta 4=0$) and only the left and right front wheels 1 and 2 are steered. When the vehicle is in this Traveling State 3, brake/drive force correction amounts $\Delta Fx1$, $\Delta Fx2$, $\Delta Fx3$, and $\Delta Fx4$ that do not disturb the longitudinal acceleration Xg, the lateral acceleration Yg, and the yaw moment M (about the center of gravity of the vehicle) can be obtained in step S120 even more easily by setting the brake/drive force correction amounts $\Delta Fx1$, $\Delta Fx2$, $\Delta Fx3$, and $\Delta Fx4$ of the wheels 1 to 4 in such a manner that the ratios thereof are as follows: $1:-1:-(\cos \delta 1-k1 \sin \delta 1):(\cos \delta 1-k1 \sin \delta 1)$. This relationship allows the amount of memory and processing required of the computer (controller 8) used for the computations to be reduced.

Thus, when the approximations δ1=δ2 and δ3=δ4=0 can be made regarding the steering angles δi of the wheels 1 to 4 and the approximations k1=k2 and k3=k4 can be made regarding the sensitivities ki of the wheels 1 to 4, these approximations can be substituted into the equation (49) as indicated in the equation (79) below.

$$\begin{aligned}\Delta F \times 1 : \Delta F \times 2 : \\ \Delta F \times 3 : \Delta F \times 4\end{aligned} = 1 : -1 : -(\cos\delta 1 - k1\sin\delta 1)/ \quad (79)$$

$$(\cos\delta 3 - k3\sin\delta 3):$$

$$(\cos\delta 1 - k1\sin\delta 1)/(\cos\delta 3 - k3\sin\delta 3)$$

$$= 1 : -1 : -(\cos\delta 1 - k1\sin\delta 1):$$

$$(\cos\delta 1 - k1\sin\delta 1)$$

$$(\because \delta 1 = \delta 2 \text{ and } \delta 3 = \delta 4 = 0)$$

A fourth traveling state, Traveling State 4, in which the sensitivities k1 and k2 of the left and right front wheels 1 and 2 can be estimated to be 0 (k1=k2=0) can be defined by adding to the aforementioned Traveling State 3 (i.e., a state in which the approximations δ1=δ2 and δ3=δ4=0 can be made regarding the steering angles δi of the wheels 1 to 4 and the approximations k1=k2 and k3=k4 can be made regarding the sensitivities ki of the wheels 1 to 4) any one of the following conditions: the drive force distributions of the left and right rear wheels 3 and 4 are set based on the wheel load ratio between the left and right rear wheels 3 and 4; the slip angles βi of the left and right front wheels 1 and 2 are large and the brake/drive forces of the left and right front wheels 1 and 2 are both approximately 0; or the slip angles βi of the left and right front wheels 1 and 2 are sufficiently small and the drive force distribution of the left and right front wheels 1 and 2 is arbitrary. Concrete examples of such traveling conditions include traveling in a straight line with any arbitrary drive force distribution and turning while very small drive forces (approximately 0) are applied to the left and right front wheels 1 and 2 and the drive force distributions of the left and right rear wheels 3 and 4 are set based on the wheel load ratio between the left and right rear wheels 3 and 4. When the vehicle is in the Traveling State 4, brake/drive force correction amounts ΔFx1, ΔFx2, ΔFx3, and ΔFx4 that do not disturb the longitudinal acceleration Xg, the lateral acceleration Yg, and the yaw moment M (about the center of gravity of the vehicle) can be obtained in step S120 even more easily by setting the brake/drive force correction amounts ΔFx1, ΔFx2, ΔFx3, and ΔFx4 of the wheels 1 to 4 in such a manner that the ratios thereof are as follows: 1:−1:−cos δ1:cos δ1. This relationship allows the amount of memory and processing required of the computer (controller 8) used for the computations to be reduced.

Thus, when the approximations δ1=δ2 and δ3=δ4=0 can be made regarding the steering angles δi of the wheels 1 to 4 and the approximations k1=k2=0 and k3=k4 can be made regarding the sensitivities ki of the wheels 1 to 4, these approximations can be substituted into the equation (49) as indicated in the equation (80) below.

$$\begin{aligned}\Delta F \times 1 : \Delta F \times 2 : \\ \Delta F \times 3 : \Delta F \times 4\end{aligned} = 1 : -1 : -(\cos\delta 1 - k1\sin\delta 1): \quad (80)$$

$$(\cos\delta 1 - k1\sin\delta 1)$$

$$= 1 : -1 : -\cos\delta 1 : \cos\delta 1 (\because k1 = k2 = 0)$$

Based on this equation (80), it should be clear that as the absolute value of the steering angles δ1, δ2 (δ1=δ2) of the left and right front wheels 1 and 2 increases, the absolute value of the brake/drive force correction amount ΔFx4 of the right rear wheel 4 decreases with respect to the absolute value of the brake/drive force correction amount ΔFx1 of the left front wheel 1. Thus, an arrangement is obtained in which the sum of the drive force correction amounts of the left and right front wheels and the sum of the drive force correction amounts of the left and right rear wheels are both 0 and the brake/drive force correction amount ΔFx4 of the right rear wheel 4 decreases with respect to the brake/drive force correction amount ΔFx1 of the left front wheel 1 as the steering angles δ1 and δ2 of the left and right front wheels 1 and 2 increase.

A comparison of a drive force distribution control in accordance with the present invention with respect drive force distribution control in accordance with the background art (Japanese Laid-Open Patent Publication No. 10-295004) and the aforementioned prior patent application will now be presented for a case in which the drive force distribution control is applied to vehicle that is not provided with a rear wheel steering mechanism (steering actuator 16). The comparison is based on the results of simulations of the drive force distribution controls. In the simulation of the present invention, the drive force correction amounts were calculated based on the flowchart of FIGS. 11A and 11B.

Figure 14:
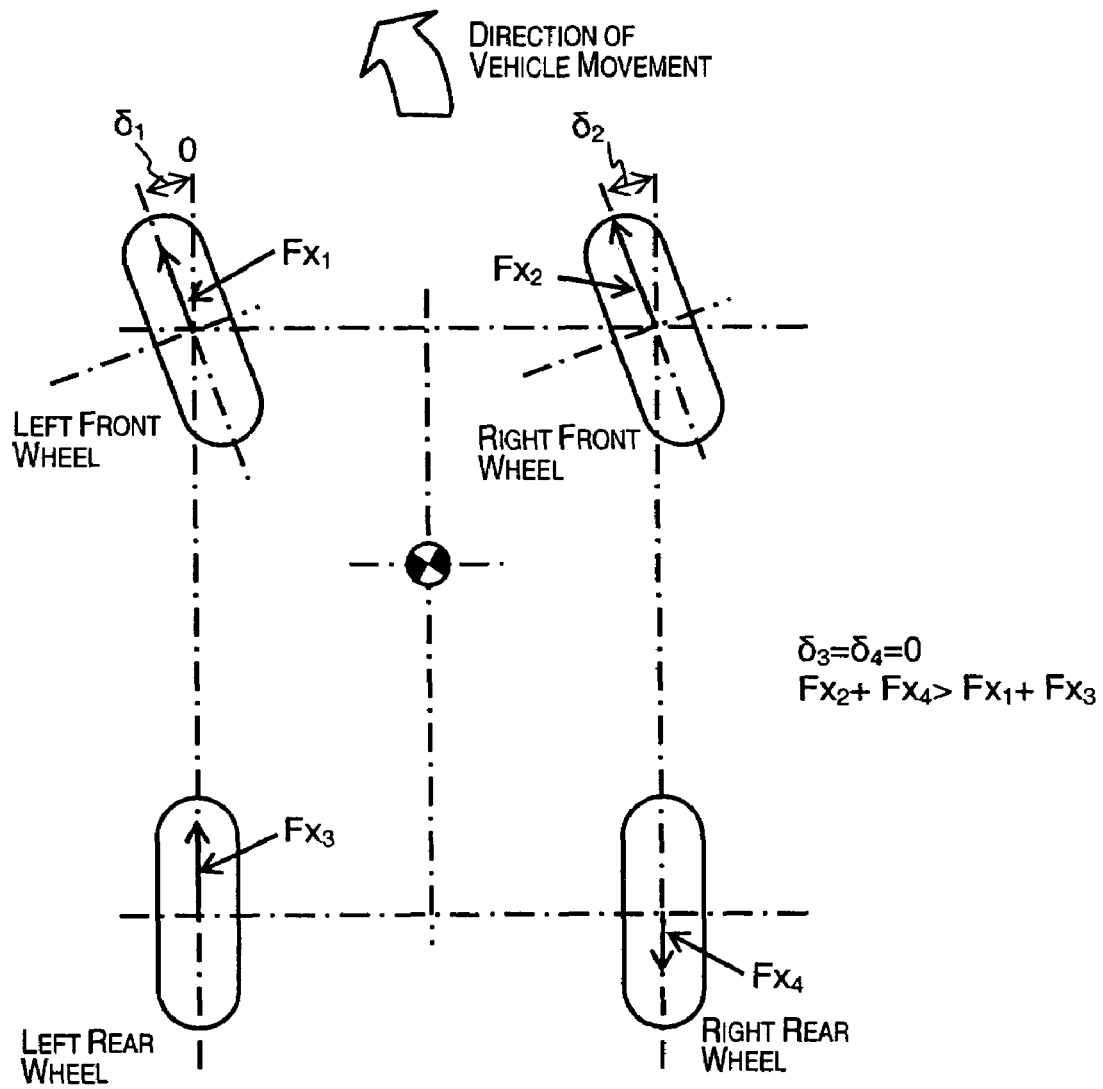
FIG. 14 illustrates a case in which a vehicle is turning left at a constant speed such that the drive forces on the left and right sides are different when suddenly the drive force of the right rear wheel goes to 0.

The vehicle used in the simulation is assumed to be a vehicle in accordance with FIG. 1 as previously described, except that there is no rear wheel steering mechanism (steering actuator 16) and the steering angles δ3 and δ4 of the rear wheels 3 and 4 are both fixed at 0. The traveling conditions assumed to exist during the simulation will now be described. At first, the vehicle is turning left at a constant speed as shown in FIG. 14; the front wheels 1 and 2 are turned sharply to the left (steering angles δ1, δ2>0) and the brake/drive forces on the left side of the vehicle are different from the brake/drive forces on the right side of the vehicle in such a manner that the sum of the brake/drive forces of the right wheels 2 and 4 is larger than the sum of the brake/drive forces of the left wheels 1, 3 (Fx2+Fx4>Fx1+Fx3). Then, while the vehicle is in the state shown in FIG. 14, the brake/drive force of the right rear wheel 4 suddenly goes to 0 (Fx4→0, ΔFx4≈−750 N). The drive force correction amounts of the remaining three wheels in such a situation were calculated in based on the previously described background art, the first embodiment, and the control sequence shown in the flowchart of FIGS. 11A and 11B. In the simulation of the prior first embodiment, the flowchart of FIGS. 11A and 11B was used with the assumption that the steering angles of the front wheels are 0 (δ1=δ2=0).

Figure 15:
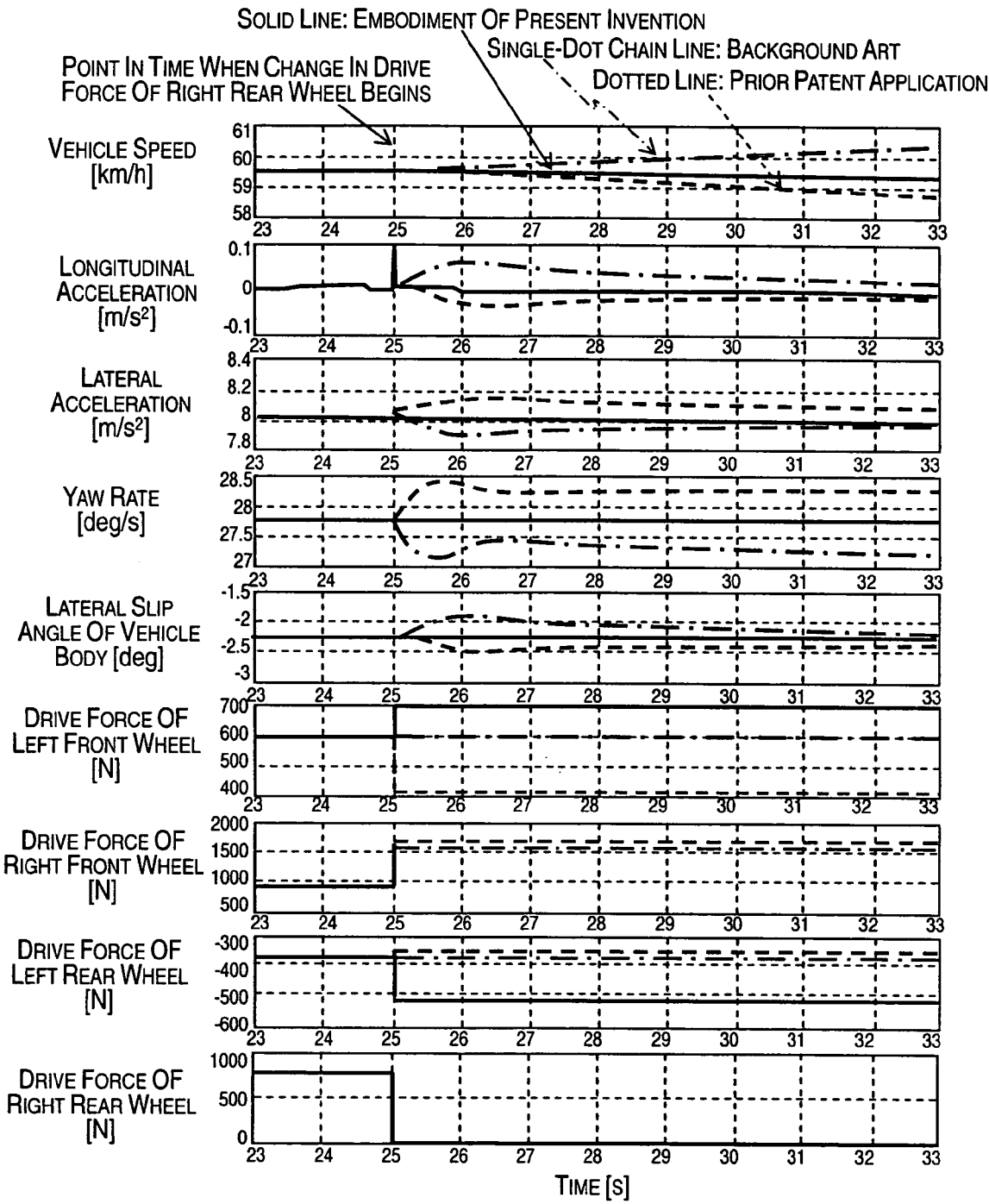
FIG. 15 shows the results of a simulation of the drive force distribution control in a case where the drive force of the right rear wheel is decreased sufficiently slowly from the state shown in FIG. 14, i.e., this figure shows the change in the drive force of each wheel as well as the changes in the vehicle speed, the longitudinal acceleration of the vehicle body, the lateral acceleration of the vehicle body, the yaw rate, and the slip angle of the vehicle body.

The change in the brake/drive force of each wheel that results when the brake/drive force of the right rear wheel goes to 0 is shown in FIG. 15. The changes in the vehicle speed, the longitudinal acceleration of the vehicle body, the lateral acceleration of the vehicle body, the yaw rate, and the slip angle of the vehicle body are also shown. The results shown in FIG. 15 indicate that when the brake/drive force of the right rear wheel is decreased sufficiently slowly from the state shown in FIG. 14, the drive force correction amounts calculated based on the flowchart of decreased do a better job of reducing changes in the vehicle speed, the longitudinal acceleration of the vehicle body, the lateral acceleration of the vehicle body, the yaw rate, and the slip angle of the vehicle body than do drive force correction amounts calculated based on the previously described background art and the aforementioned prior patent application.

The effects exhibited by the embodiments will now be described.

(A) In each of the above embodiments of the present invention, when the brake/drive forces of the four drive wheels 1 to 4 determined by the brake/drive force determining section (steps S20 to S50) are to be changed based on the motion requirements of the vehicle, the drive force revising section (step S120) revises the brake/drive forces of the left front wheel, the right front wheel, the left rear wheel, and the right rear wheel by the amounts $\Delta Fx1$, $\Delta Fx2$, $\Delta Fx3$, and $\Delta Fx4$, respectively, so as to satisfy the motion requirements of the vehicle, the revisions being based on the steering angles $\delta 1$, $\delta 2$, $\delta 3$, and $\delta 4$ and the sensitivities k1, k2, k3, and k4 of tire lateral forces of the left front wheel 1, the right front wheel 2, the left rear wheel 3, and the right rear wheel 4, respectively, with respect to a change in drive force estimated by the tire lateral force sensitivity estimating section (steps S60 to S90). Thus, in addition to suppressing changes in the longitudinal acceleration of the vehicle, both changes in lateral acceleration resulting from changes in the lateral forces acting on the tires when the brake/drive forces are revised and changes the yaw moment about the center of gravity off the vehicle can be suppressed even when the steering angles $\delta i$ (i=1 to 4) of the wheels 1 to 4 are too large to be ignored. As a result, disturbances of the vehicle behavior not intended by the driver can be prevented and the driving performance of the vehicle can be improved.

(B) When the steering angles $\delta 1$ and $\delta 2$ of the left and right front wheels are substantially equal to each other, the steering angles $\delta 3$, $\delta 4$ of the left and right rear wheels are substantially equal to each other, the difference between the sensitivities k1 and k2 of the left and right front wheels is approximately 0, and the difference between the sensitivities k3 and k4 of the left and right rear wheels is approximately 0 (i.e., when the following approximations can be made: $\delta 1=\delta 2$, $\delta 3=\delta 4$, k1=k2 and k3=k4), the drive force revising section sets the drive force correction amounts $\Delta Fx1$, $\Delta Fx2$, $\Delta Fx3$, and $\Delta Fx4$ for the left front wheel 1, the right front wheel 2, the left rear wheel 3, and the right rear wheel 4 in such a manner that the ratios of the drive force correction amounts $\Delta Fx1$, $\Delta Fx2$, $\Delta Fx3$, and $\Delta Fx4$ satisfy the following equation: $\Delta Fx1:\Delta Fx2:\Delta Fx3:\Delta Fx4=(\cos \delta 3-k3 \sin \delta 3): -(\cos \delta 3-k3 \sin \delta 3):-(\cos \delta 1-k1 \sin \delta 1):(\cos \delta 1-k1 \sin \delta 1)$. As a result, when, for example, the brake/drive forces are revised in order to prevent one of the wheels 1 to 4 from slipping or locking up under conditions where the slip angles $\delta i$ of the left and right front wheels 1 and 2 are equal, the slip angles $\delta i$ of the left and right rear wheels are the equal, the drive force distribution to the left and right front wheels 1 and 2 is set such that the ratio of the drive forces Fxi is equal to the ratio of the wheel loads Wi, the drive force distribution to the left and right rear wheels 3 and 4 is set such that the ratio of the drive forces Fxi is equal to the ratio of the wheel loads Wi, correction amounts $\Delta Fx1$, $\Delta Fx2$, $\Delta Fx3$, $\Delta Fx4$ for the brake/drive forces of the wheels 1 to 4 that suppress changes in the longitudinal acceleration, lateral acceleration, and yaw moment about the center of gravity of the vehicle can be calculated with a higher degree of precision.

(C) When the steering angles $\delta 1$ and $\delta 2$ of the left and right front wheels 1 and 2 are substantially equal to each other, the steering angles $\delta 3$ and $\delta 4$ of the left and right rear wheels 3 and 4 are substantially equal to each other, and the tire lateral force sensitivities k1, k2, k3, and k4 estimated by the tire lateral force sensitivity estimating section are all approximately 0, the drive force revising section sets the drive force correction amounts $\Delta Fxi$ of the wheels 1 to 4 in such a manner that: the sum of the drive force correction amounts for the left and right front wheels 1 and 2 and the sum of the drive force correction amounts for the left and right rear wheels 3 and 4 are both approximately 0; and the larger the steering angles $\delta 1$ and $\delta 2$ of the left and right front wheels 1 and 2 are in comparison with the steering angles $\delta 3$ and $\delta 4$ of the left and right rear wheels 3 and 4, the smaller the drive force correction amount of each rear wheel 3, 4 is in comparison with the drive force correction amount of the diagonally opposite front wheel 2, 1. More specifically, the drive force revising section sets the drive force correction amounts $\Delta Fx1$, $\Delta Fx2$, $\Delta Fx3$, and $\Delta Fx4$ for the left front wheel 1, the right front wheel 2, the left rear wheel 3, and the right rear wheel 4 in such a manner that the ratios of the drive force correction amounts $\Delta Fx1$, $\Delta Fx2$, $\Delta Fx3$, and $\Delta Fx4$ satisfy the following equation: $\Delta Fx1:\Delta Fx2:\Delta Fx3:\Delta Fx4=\cos \delta 3:-\cos \delta 3:-\cos \delta 1:\cos \delta 1$. As a result, when, for example, the brake/drive forces are revised in order to prevent one of the wheels 1 to 4 from slipping or locking up under conditions where the slip angles $\beta i$ of the wheels 1 to 4 are large and the brake/drive forces are all approximately 0 or conditions where the slip angles $\beta i$ of the wheels 1 to 4 are small (in which case the sizes of the brake/drive forces is irrelevant), correction amounts $\Delta Fxi$ for the brake/drive forces of the wheels 1 to 4 that suppress changes in the longitudinal acceleration, lateral acceleration, and yaw moment about the center of gravity of the vehicle can be calculated in a simpler manner and the amount of memory and processing required of the computer (controller 8) used for the computations can be reduced.

(D) When the steering angles $\delta 1$ and $\delta 2$ of the left and right front wheels 1 and 2 are substantially equal to each other, the steering angles $\delta 3$ and $\delta 4$ of the left and right rear wheels 3 and 4 are both approximately 0, the difference between the sensitivities k1 and k2 of the left and right front wheels is approximately 0, and the difference between the sensitivities k3 and k4 of the left and right rear wheels is approximately 0, the drive force revising section sets the drive force correction amounts $\Delta Fx1$, $\Delta Fx2$, $\Delta Fx3$, and $\Delta Fx4$ for the left front wheel 1, the right front wheel 2, the left rear wheel 3, and the right rear wheel 4 in such a manner that the ratios of the drive force correction amounts $\Delta Fx1$, $\Delta Fx2$, $\Delta Fx3$, and $\Delta Fx4$ satisfy the following equation: $\Delta Fx1:\Delta Fx2:\Delta Fx3:\Delta Fx4=1:-1:-(\cos \delta 1-k1 \sin \delta 1):(\cos \delta 1-k1 \sin \delta 1)$. As a result, when, for example, the brake/drive forces are revised in order to prevent one of the wheels 1 to 4 from slipping or locking up under conditions where only the left and right front wheels 1 and 2 are steered, correction amounts $\Delta Fxi$ for the brake/drive forces of the wheels 1 to 4 that suppress changes in the longitudinal acceleration, lateral acceleration, and yaw moment about the center of gravity of the vehicle can be calculated in a simpler manner and the amount of memory and processing required of the computer (controller 8) used for the computations can be reduced.

(E) When the steering angles $\delta 1$ and $\delta 2$ of the left and right front wheels 1 and 2 are substantially equal to each other, the steering angles $\delta 3$, $\delta 4$ of the left and right rear wheels 3 and 4 are both approximately 0, the sensitivities k1 and k2 of the left and right front wheels 1 and 2 are both approximately 0, and the sensitivities k3 and k4 of the left and right rear wheels 3 and 4 are substantially equal to each other, the drive force revising section sets the drive force correction amounts $\Delta Fxi$ of the wheels 1 to 4 in such a manner that: the sum of the drive force correction amounts for the left and right front wheels and the sum of the drive force correction amounts for the left and right rear wheels are both approximately 0; and the larger the steering angles δ1 and δ2 of the left and right front wheels 1 and 2 are, the smaller the drive force correction amount of each rear wheel 3, 4 is in comparison with the drive force correction amount of the diagonally opposite front wheel 2, 1. More specifically, the drive force revising section sets the drive force correction amounts ΔFx1, ΔFx2, ΔFx3, and ΔFx4 for the left front wheel 1, the right front wheel 2, the left rear wheel 3, and the right rear wheel 4 in such a manner that the ratios of the drive force correction amounts ΔFx1, ΔFx2, ΔFx3, and ΔFx4 satisfy the following equation: ΔFx1:ΔFx2:ΔFx3:ΔFx4=1:−1:−cos δ1: cos δ1. As a result, when, for example, the brake/drive forces are revised in order to prevent one of the wheels 1 to 4 from slipping or locking up under conditions where the drive force distributions of the left and right rear wheels 3 and 4 are set based on the ratio of the wheel loads Wi of the left and right rear wheels 3 and 4 and either the slip angles βi of the left and right front wheels 1 and 2 are large and the brake/drive forces of the left and right front wheels 1 and 2 are both approximately 0 or the slip angles βi of the left and right front wheels 1 and 2 are sufficiently small and the drive force distribution of the left and right front wheels 1 and 2 is arbitrary, correction amounts ΔFxi for the brake/drive forces of the wheels 1 to 4 that suppress changes in the longitudinal acceleration, lateral acceleration, and yaw moment about the center of gravity of the vehicle can be calculated in a simpler manner and the amount of memory and processing required of the computer (controller 8) used for the computations can be reduced.

(F) The drive force revising section is configured to set the drive force correction amounts ΔFx1, ΔFx2, ΔFx3, and ΔFx4 for the left front wheel 1, the right front wheel 2, the left rear wheel 3, and the right rear wheel 4 based on the steering angles δ1, δ2, δ3, and δ4 of the left front wheel 1, right front wheel 2, left rear wheel 3, and right rear wheel 4 and the sensitivities k1, k2, k3, and k4 (corresponding respectively to the wheels 1 and 2, 3, 4) estimated by the tire lateral force sensitivity estimating section (steps S60 to S90) in such a manner that the ratios of the drive force correction amounts ΔFx1, ΔFx2, ΔFx3, and ΔFx4 satisfy the following equation, where Lt is the tread length and L is the wheelbase of the four wheel independent drive vehicle:

$$\Delta F \times 1 : \Delta F \times 2 : \Delta F \times 3 : \Delta F \times 4 = \frac{[(Lt/L)(h4-h2)+h2(h4-h3)]}{(\cos\delta1 - k1\sin\delta1)} :$$
$$\frac{-[(Lt/L)(h3-h1)-h1(h4-h3)]}{(\cos\delta2 - k2\sin\delta2)} :$$
$$\frac{-[(Lt/L)(h4-h2)+h4(h2-h1)]}{(\cos\delta3 - k3\sin\delta3)} :$$
$$\frac{[(Lt/L)(h3-h1)+h3(h2-h1)]}{(\cos\delta4 - k4\sin\delta4)}$$

where $hi = (\sin\delta i + ki\cos\delta i)/(\cos\delta i - ki\sin\delta i)$.

As a result, when the vehicle is being driven (is traveling) in any of the states mentioned in (B) to (E) above, or even when the vehicle is driven in a state not included among those mentioned in (B) to (E) above, and the brake/drive forces are revised in order to prevent one of the wheels 1 to 4 from slipping or locking up, correction amounts ΔFxi for the brake/ drive forces of the wheels 1 to 4 that suppress changes in the longitudinal acceleration, lateral acceleration, and yaw moment about the center of gravity of the vehicle can be calculated with a high degree of precision.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drive force distribution system for controlling a four wheel independent drive vehicle comprising:
   a brake/drive force determining section configured to determine a brake/drive force to be applied to each of the four wheels based on motion requirements of the vehicle;
   a tire lateral force sensitivity estimating section configured to estimate a sensitivity k1, k2, k3, and k4 of a tire lateral force with respect to a change in the brake/drive force for each of a left front wheel, a right front wheel, a left rear wheel, and a right rear wheel, respectively; and
   a drive force revising section configured to revise the brake/drive forces to be applied to the left front wheel, the right front wheel, the left rear wheel, and the right rear wheel based on the sensitivities k1, k2, k3, k4 estimated by the tire lateral force sensitivity estimating section, and
   the drive force revising section being further configured to correct the brake/drive forces to be applied to the left front wheel, the right front wheel, the left rear wheel, and the right rear wheel by drive force correction amounts ΔFx1, ΔFx2, ΔFx3, and ΔFx4, respectively, based on the sensitivities k1, k2, k3, and k4 estimated by the tire lateral force sensitivity estimating section so as to satisfy the motion requirements of the vehicle, when the brake/ drive forces determined by the brake/drive force determining section are to be changed.

2. The drive force distribution system as recited in claim 1, wherein the drive force revising section is further configured to set the drive force correction amounts for the left front wheel, the right front wheel, the left rear wheel, and the right rear wheel such that following relationships are satisfied:

$$\frac{\Delta F \times 1}{\Delta F \times 2} = \frac{k2}{-k2}; \text{ and } \frac{\Delta F \times 2}{\Delta F \times 3} = \frac{-k1}{-k2}; \text{ and } \frac{\Delta F \times 3}{\Delta F \times 4} = \frac{-k2}{k1}$$

when the tire lateral force sensitivities estimated by the tire lateral force sensitivity estimating section are such that a difference between a product of the sensitivities k1 and k4 of the left front wheel and the right rear wheel and a product of the sensitivities k2 and k3 of the right front wheel and the left rear wheel is approximately 0.

3. The drive force distribution system as recited in claim 2, wherein the drive force revising section is further configured to set the drive force correction amounts for the left front wheel, the right front wheel, the left rear wheel, and the right rear wheel such that following relationships are satisfied:

$$\frac{\Delta F \times 1}{\Delta F \times 2} = \frac{1}{-1}; \text{ and } \frac{\Delta F \times 2}{\Delta F \times 3} = \frac{-1}{-1}; \text{ and } \frac{\Delta F \times 3}{\Delta F \times 4} = \frac{-1}{1}$$

when the tire lateral force sensitivities estimated by the tire lateral force sensitivity estimating section are such that a difference between the sensitivities k1 and k2 of the left front wheel and the right front wheel is approximately 0, or a difference between sensitivities k3 and k4 of the left rear wheel and the right rear wheel is approximately 0.

4. The drive force distribution system as recited in claim 2, wherein the drive force revising section is further configured to set the drive force correction amounts for the left front wheel, the right front wheel, the left rear wheel, and the right rear wheel such that following relationships are satisfied:

$$\frac{\Delta F \times 1}{\Delta F \times 2} = \frac{k4}{-k3}; \text{ and } \frac{\Delta F \times 2}{\Delta F \times 3} = \frac{-k3}{-k4}; \text{ and } \frac{\Delta F \times 3}{\Delta F \times 4} = \frac{-k4}{k3}$$

when the tire lateral force sensitivities estimated by the tire lateral force sensitivity estimating section are such that the sensitivities k1 and k2 of the left front wheel and the right front wheel are both approximately 0.

5. The drive force distribution system as recited in claim 1, wherein the drive force revising section is further configured to determine the drive force correction amounts $\Delta Fx1$, $\Delta Fx2$, $\Delta Fx3$, and $\Delta Fx4$ for the left front wheel, the right front wheel, the left rear wheel, and the right rear wheel based on the sensitivities k1, k2, k3, and k4 estimated by the tire lateral force sensitivity estimating section such that ratios of the drive force correction amounts $\Delta Fx1$, $\Delta Fx2$, $\Delta Fx3$, and $\Delta Fx4$ satisfy following relationships:

$$\frac{\Delta F \times 1}{\Delta F \times 2} = \frac{(Lt/L)(k4-k2) + k2(k4-k3)}{-(Lt/L)(k3-k1) - k1(k4-k3)}; \text{ and}$$

$$\frac{\Delta F \times 2}{\Delta F \times 3} = \frac{-(Lt/L)(k3-k1) + k1(k4-k3)}{-(Lt/L)(k4-k2) - k4(k2-k1)}; \text{ and}$$

$$\frac{\Delta F \times 3}{\Delta F \times 4} = \frac{-(Lt/L)(k4-k2) + k4(k2-k1)}{(Lt/L)(k3-k1) - k3(k2-k1)}$$

where Lt is a tread length and
L is a wheelbase of the four wheel independent drive vehicle.

6. The drive force distribution system as recited in claim 1, wherein the tire lateral force sensitivity estimating section is further configured to estimate the sensitivity k1, k2, k3, and k4 of the tire lateral force for each of the left front wheel, the right front wheel, the left rear wheel, and the right rear wheel, respectively, with respect to a change in the brake/drive force based on at least one of a wheel load, a road surface friction coefficient, and a lateral slip angle of each of the wheels.

7. The drive force distribution system as recited in claim 1, wherein the drive force revising section is further configured revise the brake/drive forces to be applied to the left front wheel, the right front wheel, the left rear wheel, and the right rear wheel based on steering angles $\delta1$, $\delta2$, $\delta3$, and $\delta4$ of the left front wheel, the right front wheel, the left rear wheel and the right rear wheel; and the drive force revising section being further configured to revise the brake/drive forces of the left front wheel, the right front wheel, the left rear wheel, and the right rear wheel by the drive force correction amounts $\Delta Fx1$, $\Delta Fx2$, $\Delta Fx3$, and $\Delta Fx4$, respectively, based on the steering angles $\delta1$, $\delta2$, $\delta3$, and $\delta4$ of the left front wheel, the right front wheel, the left rear wheel, and the right rear wheel and the sensitivities k1, k2, k3, and k4 estimated by the tire lateral force sensitivity estimating section so as to satisfy the motion requirements of the vehicle, when the brake/drive forces determined by the brake/drive force determining section are to be changed.

8. The drive force distribution system as recited in claim 7, wherein the drive force revising section is further configured to set the drive force correction amounts $\Delta Fx1$, $\Delta Fx2$, $\Delta Fx3$, and $\Delta Fx4$ for the left front wheel, the right front wheel, the left rear wheel, and the right rear wheel such that ratios of the drive force correction amounts $\Delta Fx1$, $\Delta Fx2$, $\Delta Fx3$, and $\Delta Fx4$ satisfy following relationships:

$$\frac{\Delta F \times 1}{\Delta F \times 2} = \frac{(\cos\delta3 - k3\sin\delta3)}{-(\cos\delta3 - k3\sin\delta3)}; \text{ and}$$

$$\frac{\Delta F \times 2}{\Delta F \times 3} = \frac{-(\cos\delta3 - k3\sin\delta3)}{-(\cos\delta1 - k1\sin\delta1)}; \text{ and}$$

$$\frac{\Delta F \times 3}{\Delta F \times 4} = \frac{-(\cos\delta1 - k1\sin\delta1)}{(\cos\delta1 - k1\sin\delta1)}$$

when the steering angles $\delta1$ and $\delta2$ of the left and right front wheels are substantially equal to each other, the steering angles $\delta3$ and $\delta4$ of the left and right rear wheels are substantially equal to each other, a difference between the sensitivities k1 and k2 of the left and right front wheels is approxi-

9. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel such that:
the sum of the drive force correction amounts for the left and right front wheels and the sum of the drive force correction amounts for the left and right rear wheels are both approximately 0, and
as the steering angles δ1 and δ2 of the left and right front wheels become larger in comparison with the steering angles δ3 and δ4 of the left and right rear wheels, the smaller the drive force correction amount of each of the left and right rear wheels is in comparison with the drive force correction amount of a diagonally opposite front wheel,
when the steering angles δ1 and δ2 of the left and right front wheels are substantially equal to each other, the steering angles δ3, δ4 of the left and right rear wheels are substantially equal to each other, and the tire lateral force sensitivities k1, k2, k3, and k4 estimated by the tire lateral force sensitivity estimating section are all approximately 0.

10. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel such that ratios of the drive force correction amounts ΔFx1, ΔFx2, ΔFx3, and ΔFx4 satisfy following relationships:

$$\frac{\Delta F \times 1}{\Delta F \times 2} = \frac{\cos\delta 3}{-\cos\delta 3}; \text{ and } \frac{\Delta F \times 2}{\Delta F \times 3} = \frac{-\cos\delta 3}{-\cos\delta 1}; \text{ and } \frac{\Delta F \times 3}{\Delta F \times 4} = \frac{-\cos\delta 1}{\cos\delta 1}$$

when the steering angles δ1 and δ2 of the left and right front wheels are substantially equal to each other, the steering angles δ3 and δ4 of the left and right rear wheels are substantially equal to each other, and the tire lateral force sensitivities k1, k2, k3 and k4 estimated by the tire lateral force sensitivity estimating section are all approximately 0.

11. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel in such a manner that the ratios of the drive force correction amounts ΔFx1, ΔFx2, ΔFx3, and ΔFx4 satisfy the following relationships:

$$\frac{\Delta F \times 1}{\Delta F \times 2} = \frac{1}{-1}; \text{ and } \frac{\Delta F \times 2}{\Delta F \times 3} = \frac{-1}{-(\cos\delta 1 - k1\sin\delta 1)}; \text{ and}$$

$$\frac{\Delta F \times 3}{\Delta F \times 4} = \frac{-(\cos\delta 1 - k1\sin\delta 1)}{(\cos\delta 1 - k1\sin\delta 1)}$$

when the steering angles δ1 and, δ2 of the left and right front wheels are substantially equal to each other, the steering angles δ3 and δ4 of the left and right rear wheels are both approximately 0, the difference between the sensitivities k1 and k2 of the left and right front wheels is approximately 0, and the difference between the sensitivities k3 and k4 of the left and right rear wheels is approximately 0.

12. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel such that:
a sum of the drive force correction amounts for the left and right front wheels and a sum of the drive force correction amounts for the left and right rear wheels are both approximately 0; and
as the steering angles δ1 and δ2 of the left and right front wheels becomes larger, the smaller the drive force correction amount of each rear wheel is in comparison with the drive force correction amount of a diagonally opposite front wheel,
when the steering angles δ1 and δ2 of the left and right front wheels are substantially equal to each other, the steering angles δ3 and δ4 of the left and right rear wheels are both approximately 0, the sensitivities k1 and k2 of the left and right front wheels are both approximately 0, and the sensitivities k3 and k4 of the left and right rear wheels are substantially equal to each other.

13. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel in such a manner that the ratios of the drive force correction amounts ΔFx1, ΔFx2, ΔFx3, and ΔFx4 satisfy the following relationships:

$$\frac{\Delta F \times 1}{\Delta F \times 2} = \frac{1}{-1}; \text{ and } \frac{\Delta F \times 2}{\Delta F \times 3} = \frac{-1}{-\cos\delta 1}; \text{ and } \frac{\Delta F \times 3}{\Delta F \times 4} = \frac{-\cos\delta 1}{\cos\delta 1}$$

when the steering angles δ1 and δ2 of the left and right front wheels are substantially equal to each other, the steering angles δ3 and δ4 of the left and right rear wheels are both approximately 0, the sensitivities k1 and k2 of the left and right front wheels are both approximately 0, and the sensitivities k3 and k4 of the left and right rear wheels are substantially equal to each other.

14. The drive force distribution system as recited in claim 7, wherein
the drive force revising section is further configured to set the drive force correction amounts ΔFx1, ΔFx2, ΔFx3, and ΔFx4 for the left front wheel, the right front wheel, the left rear wheel, and the right rear wheel based on the steering angles δ1, δ2, δ3, and δ4 of the left front wheel, right front wheel, left rear wheel, and right rear wheel and the sensitivities k1, k2, k3, and k4 estimated by the tire lateral force sensitivity estimating section such manner that ratios of the drive force correction amounts ΔFx1, ΔFx2, ΔFx3, and ΔFx4 satisfy following relationships:

$$\frac{\Delta F \times 1}{\Delta F \times 2} = \frac{[(Lt/L)(h4-h2) + h2(h4-h3)]/(\cos\delta 1 - k1\sin\delta 1)}{-[(Lt/L)(h3-h1) + h1(h4-h3)]/(\cos\delta 2 - k2\sin\delta 2)};$$

and $$\frac{\Delta F \times 2}{\Delta F \times 3} = \frac{-[(Lt/L)(h3-h1) + h1(h4-h3)]/(\cos\delta 2 - k2\sin\delta 2)}{-[(Lt/L)(h4-h2) + h4(h2-h1)]/(\cos\delta 3 - k3\sin\delta 3)};$$

-continued and $$\frac{\Delta F \times 3}{\Delta F \times 4} = \frac{-[(Lt/L)(h4-h2) + h4(h2-h1)]/(\cos\delta 3 - k3\sin\delta 3)}{[(Lt/L)(h3-h1) + h3(h2-h1)]/(\cos\delta 4 - k4\sin\delta 4)}$$

where Lt is the tread length and
L is the wheel base of the four wheel independent drive vehicle and
hi=(sin δi+ki cos δi)/(cos δi−ki sin δi).

15. A drive force distribution system for controlling a four wheel independent drive vehicle comprising:
    brake/drive force determining means for determining a brake/drive force to be applied to each of the four wheels based on motion requirements of the vehicle;
    tire lateral force sensitivity estimating means for estimating a sensitivity k1, k2, k3, and k4 of a tire lateral force with respect to a change in the brake/drive force for each of a left front wheel, a right front wheel, a left rear wheel, and a right rear wheel, respectively, and
    drive force revising means for revising the brake/drive forces to be applied to the left front wheel, the right front wheel, the left rear wheel, and the right rear wheel based on the sensitivities k1, k2, k3, and k4 estimated by the tire lateral force sensitivity estimating means; and
    the drive force revising means further configured to correct the brake/drive forces to be applied to the left front wheel, the right front wheel, the left rear wheel, and the right rear wheel by drive force correction amounts ΔFx1, ΔFx2, ΔFx3, and ΔFx4, respectively, based on the sensitivities k1, k2, k3, and k4 estimated by the tire lateral force sensitivity estimating means so as to satisfy the motion requirements of the vehicle, when the brake/drive forces determined by the brake/drive force determining means are to be changed.

16. The drive force distribution system as recited in claim 15, wherein
    the drive force revising means is further configured to revise the brake/drive forces to be applied to the left front wheel, the right front wheel, the left rear wheel, and the right rear wheel based on the steering angles δ1, δ2, δ3, and δ4 of the left front wheel, the right front wheel, the left rear wheel and the right rear wheel; and
    the drive force revising section being further configured to correct the brake/drive forces of the left front wheel, the right front wheel, the left rear wheel, and the right rear wheel by drive force correction amounts ΔFx1, ΔFx2, ΔFx3, and ΔFx4, respectively, based on the steering angles δ1, δ2, δ3, and δ4 of the left front wheel, the right front wheel, the left rear wheel, and the right rear wheel and the sensitivities k1, k2, k3, and k4 estimated by the tire lateral force sensitivity estimating means so as to satisfy the motion requirements of the vehicle, when the brake/drive forces determined by the brake/drive force determining means are to be changed.

17. A method of controlling drive force distribution of a four wheel independent drive vehicle comprising:
    determining a brake/drive force to be applied to each of the four wheels based on motion requirements of the vehicle;
    estimating a sensitivity k1, k2, k3, and k4 of a tire lateral force with respect to a change in the brake/drive force for each of a left front wheel, a right front wheel, a left rear wheel, and a right rear wheel, respectively;
    revising the brake/drive forces to be applied to the left front wheel, the right front wheel, the left rear wheel, and the right rear wheel based on the sensitivities k1, k2, k3, and k4 that were estimated; and
    correcting the brake/drive forces to be applied to the left front wheel, the right front wheel, the left rear wheel, and the right rear wheel by drive force correction amounts ΔFx1, ΔFx2, ΔFx3, and ΔFx4, respectively, based on the sensitivities k1, k2, k3, and k4 that were estimated by to satisfy the motion requirements of the vehicle, when the brake/drive forces are to be changed.

18. The drive force distribution system as recited in claim 15, wherein
    the revising of the brake/drive forces to be applied to the left front wheel, the right front wheel, the left rear wheel, and the right rear wheel is further based on the steering angles δ1, δ2, δ3, and δ4 of the left front wheel, the right front wheel, the left rear wheel and the right rear wheel; and
    the correcting of the brake/drive forces of the left front wheel, the right front wheel, the left rear wheel, and the right rear wheel by the drive force correction amounts ΔFx1, ΔFx2, ΔFx3, and ΔFx4, respectively, is further based on the steering angles δ1, δ2, δ3, and δ4 of the left front wheel, the right front wheel, the left rear wheel, and the right rear wheel and the sensitivities k1, k2, k3, and k4 that were estimated to satisfy the motion requirements of the vehicle, when the brake forces and drive forces are to be changed.

* * * * *